(12) United States Patent
Nakano et al.

(10) Patent No.: US 9,785,128 B2
(45) Date of Patent: Oct. 10, 2017

(54) INFORMATION NOTIFICATION METHOD, PROGRAM, AND INFORMATION NOTIFICATION SYSTEM

(71) Applicant: Panasonic Intellectual Property Corporation of America, Torrance, CA (US)

(72) Inventors: Toshihisa Nakano, Osaka (JP); Takahiro Yamaguchi, Osaka (JP); Hiroshi Amano, Osaka (JP); Takashi Morimoto, Osaka (JP); Masayuki Kozuka, Osaka (JP); Motoji Ohmori, Osaka (JP); Takako Hirose, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 360 days.

(21) Appl. No.: 14/421,281

(22) PCT Filed: Jun. 16, 2014

(86) PCT No.: PCT/JP2014/003215
§ 371 (c)(1),
(2) Date: Feb. 12, 2015

(87) PCT Pub. No.: WO2014/208040
PCT Pub. Date: Dec. 31, 2014

(65) Prior Publication Data
US 2015/0205275 A1   Jul. 23, 2015

Related U.S. Application Data

(60) Provisional application No. 61/838,585, filed on Jun. 24, 2013.

(51) Int. Cl.
G05B 15/02   (2006.01)
G01C 21/00   (2006.01)
(Continued)

(52) U.S. Cl.
CPC ............ *G05B 15/02* (2013.01); *G01C 21/00* (2013.01); *G06Q 10/047* (2013.01);
(Continued)

(58) Field of Classification Search
CPC ...... B05B 15/02; G06Q 10/047; G06Q 30/02; G06Q 10/109; H04L 12/2803;
(Continued)

(56) References Cited

U.S. PATENT DOCUMENTS 5,940,803 A * 8/1999 Kanemitsu ........... G01C 21/343
701/533
8,068,977 B2 * 11/2011 Ozawa .................. G01C 21/00
340/995.1
(Continued)

FOREIGN PATENT DOCUMENTS

JP    11-134407    5/1999
JP    2002-303687    10/2002
(Continued)

OTHER PUBLICATIONS

Mitchell et al., Strategic Pre-Departure Coordination With Stochastic Trajectory Modeling, 2012, IEEE, p. H4-1 to H4-8.*
(Continued)

*Primary Examiner* — McDieunel Marc
(74) *Attorney, Agent, or Firm* — Wenderoth, Lind & Ponack, L.L.P.

(57) ABSTRACT

An information notification method in an information notification system, including: an acquiring step for acquiring today's required time which is required for traveling from a departure point to a destination included in behavior information; a determining step for determining today's departure time using the acquired today's required time and an arrival time included in the behavior information; a judging step for judging whether or not the determined today's
(Continued)

departure time is earlier than a typical departure time included in the behavior information; a notifying step for notifying a notifying apparatus owned by the user of notification information for adjusting the behavior of the user, when judgment is made that the determined today's departure time is earlier than the typical departure time; and an output step for causing the notifying apparatus to output the notified notification information.

15 Claims, 38 Drawing Sheets

(51) Int. Cl.
| | | |
|---|---|---|
| G06Q 30/02 | (2012.01) | |
| G06Q 10/04 | (2012.01) | |
| G06Q 10/10 | (2012.01) | |
| H04L 12/28 | (2006.01) | |
| H04W 8/08 | (2009.01) | |
| H04W 64/00 | (2009.01) | |

(52) U.S. Cl.
CPC ........... *G06Q 10/109* (2013.01); *G06Q 30/02* (2013.01); *H04L 12/2803* (2013.01); *H04W 8/08* (2013.01); *H04W 64/00* (2013.01)

(58) Field of Classification Search
CPC ........ H04W 8/08; H04W 64/00; G01C 21/00; G01C 21/28; G01C 21/343
See application file for complete search history.

(56) References Cited

U.S. PATENT DOCUMENTS

| | | | | |
|---|---|---|---|---|
| 2003/0212996 | A1* | 11/2003 | Wolzien | G01C 21/28 725/60 |
| 2010/0036601 | A1* | 2/2010 | Ozawa | G01C 21/00 701/465 |
| 2013/0344859 | A1* | 12/2013 | Abramson | G06Q 50/265 455/418 |
| 2014/0278070 | A1* | 9/2014 | McGavran | G01C 21/00 701/465 |
| 2014/0278086 | A1* | 9/2014 | San Filippo | G01C 21/3423 701/527 |
| 2015/0066479 | A1* | 3/2015 | Pasupalak | G06F 17/27 704/9 |

FOREIGN PATENT DOCUMENTS

| | | |
|---|---|---|
| JP | 2003-215280 | 7/2003 |
| JP | 2004-241985 | 8/2004 |
| JP | 2010-96536 | 4/2010 |

OTHER PUBLICATIONS

Ngai et al., Personalized Mobile-Assisted Smart Transportation, 2016, IEEE, p. 158-160.*

International Search Report dated Jul. 8, 2014 in International (PCT) Application No. PCT/JP2014/003215.

* cited by examiner

| USER ID | ADDRESS | DATE | DEPARTURE TIME | RETURN TIME | ARRIVAL POINT (DESTINATION) | ARRIVAL TIME | TRANSPORTATION MEANS |
|---|---|---|---|---|---|---|---|
| 98765 | 5-4-3 B TOWN, A CITY | : | : | : | : | : | : |
| | | 2013/4/4 | 7:30 | 21:00 | 3-2-1 Y TOWN, X CITY | 8:13 | TRAIN |
| | | 2013/4/5 | 7:32 | 20:20 | 3-2-1 Y TOWN, X CITY | 8:15 | TRAIN |
| | | 2013/4/6 | 13:00 | 15:30 | 1-2-3 D TOWN, A CITY | 13:20 | CAR |
| | | : | : | : | : | : | : |

| USER ID | TYPICAL WEEKDAY BEHAVIOR PATTERN | | TYPICAL WEEKEND BEHAVIOR PATTERN | |
|---|---|---|---|---|
| | TRANSPORTATION MEANS | TRAIN | TRANSPORTATION MEANS | CAR |
| | DESTINATION | 3-2-1 Y TOWN, X CITY | DESTINATION | 2-2-2 E TOWN, D CITY |
| 98765 | 6:30 | WAKE UP | 9:00 | WAKE UP |
| | 7:30 | LEAVE HOME | 10:00 | LEAVE HOME |
| | 8:15 | ARRIVE AT WORKPLACE | 10:30 | ARRIVE AT GYM |
| | ⋮ | ⋮ | ⋮ | ⋮ |
| | 20:00 | LEAVE WORKPLACE | 13:30 | LEAVE GYM |
| | 20:30 | ARRIVE AT HOME | 14:00 | ARRIVE AT HOME |
| | ⋮ | ⋮ | ⋮ | ⋮ |
| | 23:00 | GO TO BED | 23:00 | GO TO BED |

| TYPE | TERMINAL APPARATUS ID | PRESENCE/ABSENCE OF OUTPUT PORTION | POWER STATE |
|---|---|---|---|
| TELEVISION | 1234567 | PRESENT (DISPLAY) | ON |
| REFRIGERATOR | 8957328 | ABSENT | ON |
| MICROWAVE OVEN | 4567892 | PRESENT (DISPLAY, BUZZER SOUND) | OFF |
| SMARTPHONE | 1357908 | PRESENT (DISPLAY, VIBRATION) | ON |
| AIR CONDITIONER | 2461357 | ABSENT | ON |
| RICE COOKER | 6574329 | ABSENT | OFF |
| WASHING MACHINE | 3579102 | PRESENT (DISPLAY) | OFF |
| LIGHTING FIXTURE 1 | 9753146 | ABSENT | ON |
| LIGHTING FIXTURE 2 | 9752468 | ABSENT | OFF |
| ELECTRONIC SHUTTER DEVICE | 8642057 | ABSENT | OFF |
| INTERCOM | 1537246 | PRESENT (DISPLAY) | ON |
| TABLET APPARATUS | 2648531 | PRESENT (DISPLAY) | OFF |
| ELECTRONIC WASHSTAND | 3579864 | PRESENT (DISPLAY) | OFF |

| USER ID | ADDRESS | DATE | WAKEUP TIME | DEPARTURE TIME | RETURN TIME | ARRIVAL POINT (DESTINATION) | ARRIVAL TIME | TRANSPORTATION MEANS |
|---|---|---|---|---|---|---|---|---|
| 98765 | 5-4-3 B TOWN, A CITY | ⋮ | ⋮ | ⋮ | ⋮ | ⋮ | ⋮ | ⋮ |
| | | 2013/4/4 | 6:35 | 7:30 | 21:00 | 3-2-1 Y TOWN, X CITY | 8:13 | TRAIN |
| | | 2013/4/5 | 6:30 | 7:32 | 20:20 | 3-2-1 Y TOWN, X CITY | 8:15 | TRAIN |
| | | 2013/4/6 | 9:00 | 13:00 | 15:30 | 1-2-3 D TOWN, A CITY | 13:20 | CAR |
| | | ⋮ | ⋮ | ⋮ | ⋮ | ⋮ | ⋮ | ⋮ |

| USER ID | TYPICAL WEEKDAY BEHAVIOR PATTERN | | | TYPICAL WEEKEND BEHAVIOR PATTERN | | | |
|---|---|---|---|---|---|---|---|
| | TIME REQUIRED FROM WAKING UP TO DEPARTURE | 40 MINUTES | | TIME REQUIRED FROM WAKING UP TO DEPARTURE | 30 MINUTES | | |
| | TRANSPORTATION MEANS | TRAIN | | TRANSPORTATION MEANS | CAR | | |
| | DESTINATION | 3-2-1 Y TOWN, X CITY | | DESTINATION | 2-2-2 E TOWN, D CITY | | |
| 98765 | 6:30 | WAKE UP | | 9:00 | WAKE UP | | |
| | 7:30 | LEAVE HOME | | 10:00 | LEAVE HOME | | |
| | 8:15 | ARRIVE AT WORKPLACE | | 10:30 | ARRIVE AT GYM | | |
| | : | : | | : | : | | |
| | 20:00 | LEAVE WORKPLACE | | 13:30 | LEAVE GYM | | |
| | 20:30 | ARRIVE AT HOME | | 14:00 | ARRIVE AT HOME | | |
| | : | : | | : | : | | |
| | 23:00 | GO TO BED | | 23:00 | GO TO BED | | |

| TYPE | TERMINAL APPARATUS ID | PRESENCE/ABSENCE OF OUTPUT PORTION | POWER STATE | PRESENCE/ ABSENCE OF OPERATION |
|---|---|---|---|---|
| TELEVISION | 1234567 | PRESENT (DISPLAY) | ON | ABSENT |
| REFRIGERATOR | 8957328 | ABSENT | ON | ABSENT |
| MICROWAVE OVEN | 4567892 | PRESENT (DISPLAY, BUZZER SOUND) | OFF | ABSENT |
| SMARTPHONE | 1357908 | PRESENT (DISPLAY, VIBRATION) | ON | ABSENT |
| AIR CONDITIONER | 2461357 | ABSENT | ON | ABSENT |
| RICE COOKER | 6574329 | ABSENT | OFF | ABSENT |
| WASHING MACHINE | 3579102 | PRESENT (DISPLAY) | OFF | ABSENT |
| LIGHTING FIXTURE 1 | 9753146 | ABSENT | ON | ABSENT |
| LIGHTING FIXTURE 2 | 9752468 | ABSENT | OFF | ABSENT |
| ELECTRONIC SHUTTER DEVICE | 8642057 | ABSENT | OFF | ABSENT |
| INTERCOM | 1537246 | PRESENT (DISPLAY) | ON | PRESENT |
| TABLET APPARATUS | 2648531 | PRESENT (DISPLAY) | OFF | ABSENT |
| ELECTRONIC WASHSTAND | 3579864 | PRESENT (DISPLAY) | OFF | ABSENT |

| TYPE | TERMINAL APPARATUS ID | PRESENCE/ABSENCE OF OUTPUT PORTION | POWER STATE | LOCATION |
|---|---|---|---|---|
| TELEVISION | 1234567 | PRESENT (DISPLAY) | ON | LIVING ROOM |
| REFRIGERATOR | 8957328 | ABSENT | ON | KITCHEN |
| MICROWAVE OVEN | 4567892 | PRESENT (DISPLAY, BUZZER SOUND) | OFF | KITCHEN |
| SMARTPHONE | 1357908 | PRESENT (DISPLAY, VIBRATION) | ON | — |
| AIR CONDITIONER | 2461357 | ABSENT | ON | LIVING ROOM |
| RICE COOKER | 6574329 | ABSENT | OFF | KITCHEN |
| WASHING MACHINE | 3579102 | PRESENT (DISPLAY) | OFF | WASHROOM |
| LIGHTING FIXTURE 1 | 9753146 | ABSENT | ON | LIVING ROOM |
| LIGHTING FIXTURE 2 | 9752468 | ABSENT | OFF | BEDROOM |
| ELECTRONIC SHUTTER DEVICE | 8642057 | ABSENT | OFF | GARAGE |
| INTERCOM | 1537246 | PRESENT (DISPLAY) | ON | LIVING ROOM |
| TABLET APPARATUS | 2648531 | PRESENT (DISPLAY) | OFF | — |
| ELECTRONIC WASHSTAND | 3579864 | PRESENT (DISPLAY) | OFF | WASHROOM |

FIG. 32

| TYPE | TERMINAL APPARATUS ID | PRESENCE/ ABSENCE OF OUTPUT PORTION | POWER STATE | LOCATION | PRESENCE/ ABSENCE OF OPERATION |
|---|---|---|---|---|---|
| TELEVISION | 1234567 | PRESENT (DISPLAY) | ON | LIVING ROOM | ABSENT |
| REFRIGERATOR | 8957328 | ABSENT | ON | KITCHEN | PRESENT |
| MICROWAVE OVEN | 4567892 | PRESENT (DISPLAY, BUZZER SOUND) | OFF | KITCHEN | ABSENT |
| SMARTPHONE | 1357908 | PRESENT (DISPLAY, VIBRATION) | ON | — | ABSENT |
| AIR CONDITIONER | 2461357 | ABSENT | ON | LIVING ROOM | ABSENT |
| RICE COOKER | 6574329 | ABSENT | OFF | KITCHEN | ABSENT |
| WASHING MACHINE | 3579102 | PRESENT (DISPLAY) | OFF | WASHROOM | ABSENT |
| LIGHTING FIXTURE 1 | 9753146 | ABSENT | ON | LIVING ROOM | ABSENT |
| LIGHTING FIXTURE 2 | 9752468 | ABSENT | OFF | BEDROOM | ABSENT |
| ELECTRONIC SHUTTER DEVICE | 8642057 | ABSENT | OFF | GARAGE | ABSENT |
| INTERCOM | 1537246 | PRESENT (DISPLAY) | ON | LIVING ROOM | ABSENT |
| TABLET APPARATUS | 2648531 | PRESENT (DISPLAY) | OFF | — | ABSENT |
| ELECTRONIC WASHSTAND | 3579864 | PRESENT (DISPLAY) | OFF | WASHROOM | ABSENT |

600

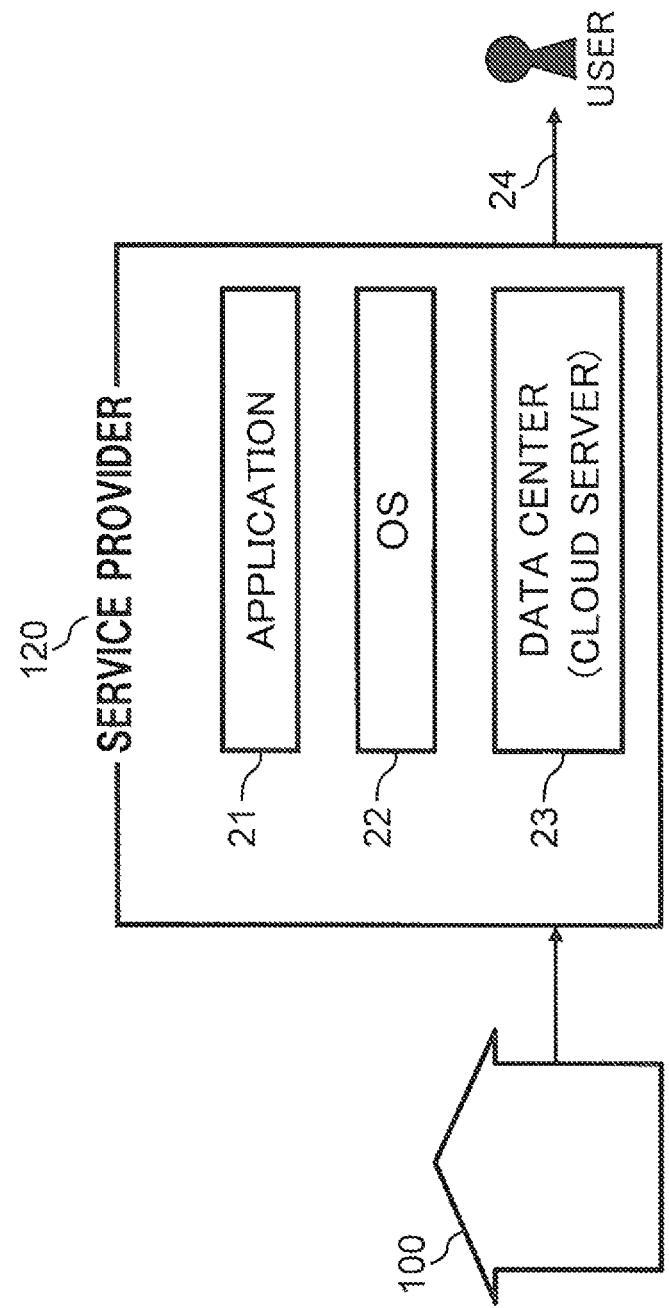

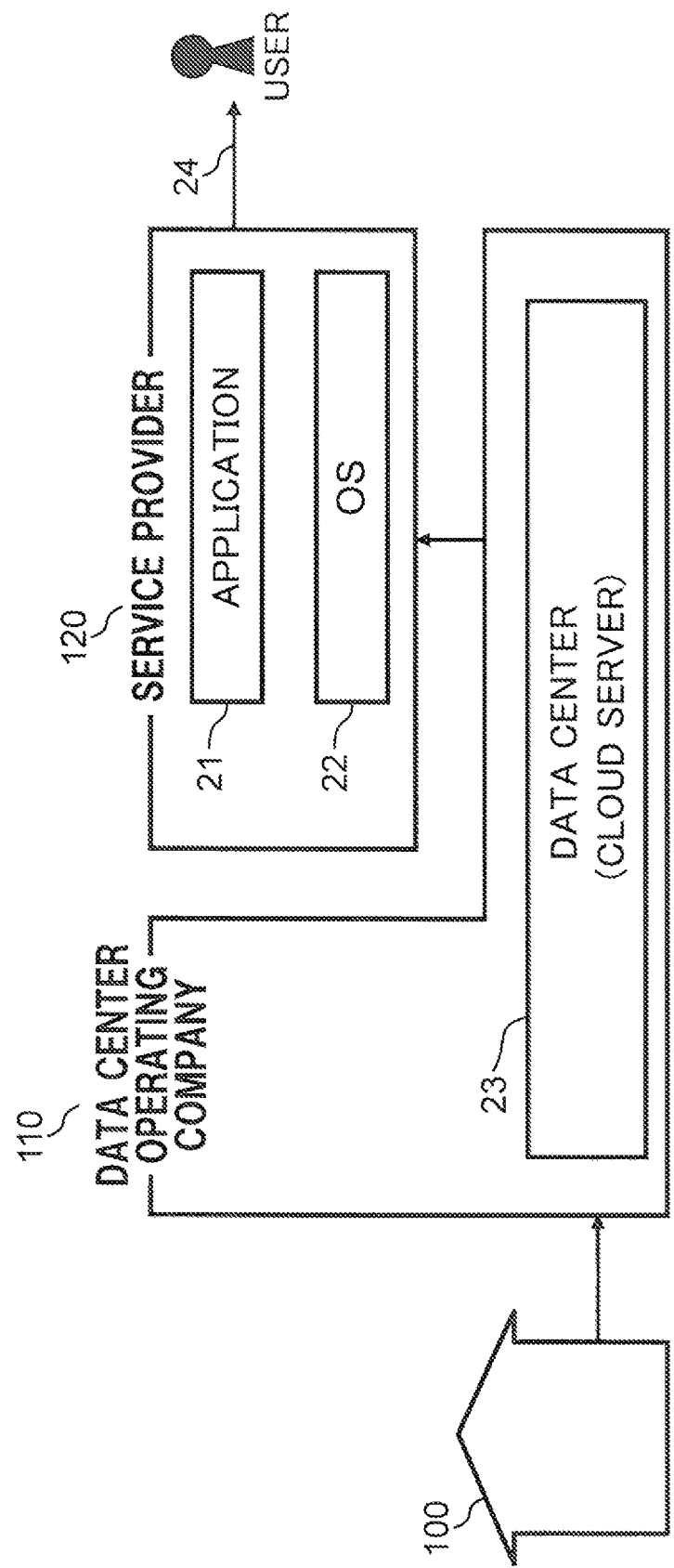

INFORMATION NOTIFICATION METHOD, PROGRAM, AND INFORMATION NOTIFICATION SYSTEM

TECHNICAL FIELD

The present disclosure relates to an information notification method, a program, and an information notification system for notifying a user of information related to behavior of the user.

BACKGROUND ART

In recent years, with the proliferation of electrical home appliances with network connecting functions, systems for controlling electrical home appliances via a network have been proposed. In such a system, a user can be prompted into action in accordance with a behavior pattern of the user.

For example, Patent Document 1 discloses an alarm system having a wakeup function. The alarm system is equipped with a function of maintaining and managing traffic information of various transportation means. When a user notifies a wakeup time and transportation means to be used, the alarm system extracts traffic information of the transportation means prior to the wakeup time and automatically resets the wakeup time set by the user in accordance with the traffic information.

However, in Patent Document 1, further improvements have been necessary.

CITATION LIST

Patent Document

Patent Document 1: Japanese Unexamined Patent Publication No. 2002-303687

SUMMARY OF INVENTION

In order to solve the above problem, an aspect of the present disclosure is an information notification method in an information notification system which notifies a user of information related to behavior of the user, the information notification system including a behavior information manager which manages behavior information related to the behavior of the user, the behavior information including information on a departure point and a destination of the user, a typical departure time at which the user departs from the departure point, and a typical arrival time at which the user arrives at the destination, the information notification method comprising:

an acquiring step for acquiring today's required time required for traveling from the departure point to the destination, the departure point and the destination being included in the managed behavior information;

a determining step for determining today's departure time using the acquired today's required time and the arrival time included in the behavior information;

a judging step for judging whether or not the determined today's departure time is earlier than the typical departure time included in the behavior information;

a notifying step for notifying a notifying apparatus owned by the user of notification information for adjusting the behavior of the user, when it is judged that the determined today's departure time is earlier than the typical departure time; and an output step for causing the notifying apparatus to output the notified notification information.

According to the above aspect, it is possible to achieve further improvements.

BRIEF DESCRIPTION OF DRAWINGS

FIG. 3 shows an example of a behavior history of a user according to the first embodiment.

FIG. 4 shows an example of a behavior pattern of a user according to the first embodiment.

FIG. 5 shows an example of apparatus information according to the first embodiment.

FIG. 21 shows an example of a behavior history of a user according to the third embodiment.

FIG. 22 shows an example of a behavior pattern of a user according to the third embodiment.

FIG. 30 shows an example of apparatus information which differs from FIG. 5.

FIG. 31 shows an example of apparatus information which differs from FIGS. 5 and 30.

FIG. 32 shows an example of apparatus information which differs from FIGS. 5, 30, and 31.

FIG. 34 is an example of a proprietary data center type.

FIG. 35 shows an example of a type using IaaS.

DESCRIPTION OF EMBODIMENTS

Figure 1:
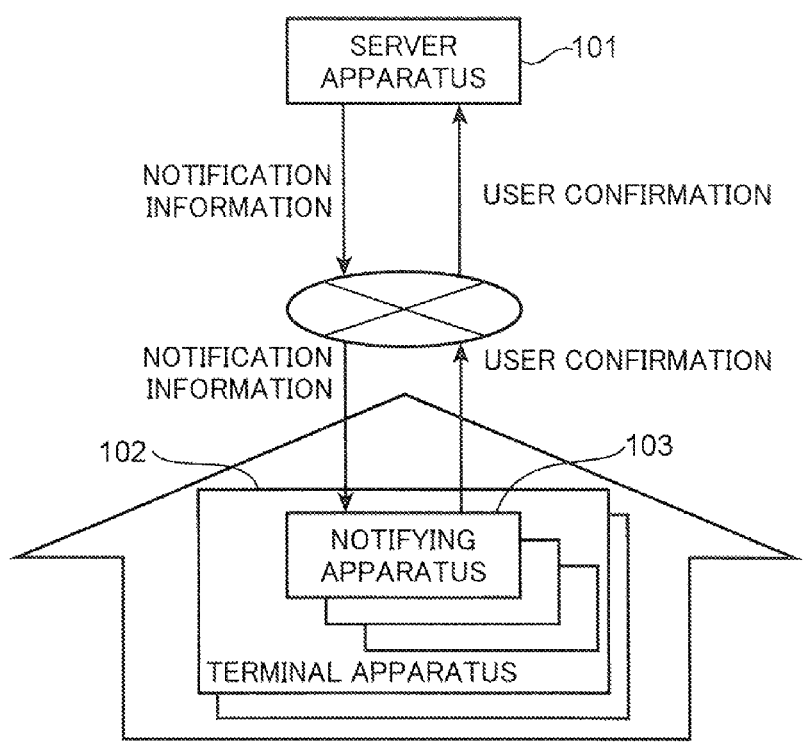
FIG. 1 is a configuration diagram of an information notification system according to a first embodiment.

Circumstances to Invent an Aspect of the Present Disclosure

First, viewpoints of an aspect according to the present disclosure will be described.

In Patent Document 1 described above, a wakeup time is reset in accordance with traffic information related to transportation means set in advance by a user. Therefore, presentation of more detailed information related to a departure time in accordance with a behavior pattern of the user after waking up is not taken into consideration.

In comparison, it is desired that information related to the behavior of the user such as a suggested departure time be notified to the user in a precise manner in accordance with a daily behavior pattern of the user.

Based on the considerations described above, the present inventors has arrived to invent the respective aspects according to the present disclosure as presented below.

An aspect of the present disclosure is an information notification method in an information notification system which notifies a user of information related to behavior of the user, the information notification system including a behavior information manager which manages behavior information related to the behavior of the user, the behavior information including information on a departure point and a destination of the user, a typical departure time at which the user departs from the departure point, and a typical arrival time at which the user arrives at the destination, the information notification method comprising:

an acquiring step for acquiring today's required time required for traveling from the departure point to the destination, the departure point and the destination being included in the managed behavior information;

a determining step for determining today's departure time using the acquired today's required time and the arrival time included in the behavior information;

a judging step for judging whether or not the determined today's departure time is earlier than the typical departure time included in the behavior information;

a notifying step for notifying a notifying apparatus owned by the user of notification information for adjusting the behavior of the user, when it is judged that the determined today's departure time is earlier than the typical departure time; and an output step for causing the notifying apparatus to output the notified notification information.

According to the present aspect, when it is judged that the determined today's departure time is earlier than a typical departure time included in behavior information, notification information for adjusting the behavior of a user is notified to a notifying apparatus owned by the user. Therefore, when the user needs to advance the departure time, notification information is notified to the notifying apparatus and the notification information is output by the notifying apparatus. Therefore, the user may advance today's departure time when notification information is output. On the other hand, notification information is not notified when the departure time need not be advanced. Therefore, the botheration of having notification information output even when the departure time need not be advanced can be avoided.

In the aspect described above, for example, the information notification system may further include an apparatus information manager which manages apparatus information related to one or more terminal apparatuses owned by the user, the one or more terminal apparatuses may include one or more notifying apparatuses as the notifying apparatus, the apparatus information may include output portion information indicating whether or not the terminal apparatus includes an output portion capable of informing the notification information to the user, the information notification method may further include a selecting step for selecting a notifying apparatus which is a notification destination of the notification information, using the managed apparatus information, wherein in the selecting step, a terminal apparatus including the output portion may be selected as the notifying apparatus, using the output portion information, and in the notifying step, the notification information may be notified to the terminal apparatus selected as the notifying apparatus in the selecting step.

According to the present aspect, a terminal apparatus including an output portion capable of informing notification information to a user is selected as the notifying apparatus. Notification information is notified to the terminal apparatus selected as the notifying apparatus. Therefore, notification information is to be informed to the user by the output portion.

In the aspect described above, for example, the apparatus information may further include power information which indicates whether power supply of the terminal apparatus is on or off, and in the selecting step, a terminal apparatus which includes the output portion and whose power supply is on may be selected as the notifying apparatus, using the output portion information and the power information.

According to the present aspect, a terminal apparatus which includes an output portion and whose power supply is on is selected as the notifying apparatus using output portion information and power information. Notification information is to be informed to the user without having to perform an operation for turning on power or the like.

In the aspect described above, for example, the apparatus information may further include operation information which indicates whether or not the terminal apparatus is being operated by the user, and in the selecting step, a terminal apparatus, which includes the output portion and which is being operated by the user, may be selected as the notifying apparatus, using the output portion information and the operation information.

According to the present aspect, a terminal apparatus which includes an output portion and which is being operated by the user is selected as the notifying apparatus.

Therefore, notification information is informed to the user by the output portion of the terminal apparatus being operated by the user. Therefore, the risk of the user overlooking notification information is reduced.

In the aspect described above, for example, the apparatus information may further include power information indicating whether power supply of the terminal apparatus is on or off and location information indicating a room in which the terminal apparatus is arranged, the selecting step may include a step for extrapolating a room in which the user is present, using the power information, and in the selecting step, a terminal apparatus which is arranged in the extrapolated room and which includes the output portion may be selected as the notifying apparatus.

According to the present aspect, a room in which the user is present is extrapolated using power information indicating whether the power supply of the terminal apparatus is on or off. A terminal apparatus arranged in the room in which the user is extrapolated to be present and which includes an output portion is selected as the notifying apparatus. Therefore, notification information is informed to the user by the output portion of the terminal apparatus arranged in the room in which the user is present. Therefore, the risk of the user overlooking notification information is reduced.

For example, the aspect described above may further include:

an input accepting step for accepting a user confirmation indicating that the user has confirmed the notification information notified to the notifying apparatus; and a deleting step for deleting from the notifying apparatus the notification information output to the notifying apparatus when the user confirmation is accepted in the input accepting step.

Once the user confirms the notification information notified by the notifying apparatus, the notification information output to the notifying apparatus is no longer required. According to the present aspect, once confirmation by the user is accepted, the notification information output to the notifying apparatus is deleted. Therefore, a situation where notification information is continuously output to the notifying apparatus even after the notification information is no longer required can be avoided.

In the aspect described above, for example, the information notification system may further include an apparatus information manager which manages apparatus information related to one or more terminal apparatuses owned by the user, the apparatus information may include output portion information indicating whether or not the terminal apparatus includes an output portion capable of informing the notification information to the user and whether or not the output portion has an alarm function which emits an alarm to the user, the behavior information may further include information on a typical wakeup time of the user, in the judging step, it may be judged whether or not the determined today's departure time is earlier than the typical wakeup time of the user included in the behavior information, in the notifying step, when it is judged that the determined today's departure time is earlier than the typical wakeup time, a terminal apparatus including the output portion having the alarm function may be notified of an instruction to advance a set time of the alarm function as the notification information, and in the output step, a set time of the alarm function of the terminal apparatus may be advanced in accordance with contents of the notified instruction.

According to the present aspect, when it is judged that the determined today's departure time is earlier than a typical departure time, a terminal apparatus including an output portion having an alarm function is notified of an instruction to advance a set time of the alarm function as notification information. The set time of the alarm function of the terminal apparatus is advanced according to contents of the notified instruction. Therefore, when the departure time needs to be advanced, a wakeup time of the user can be advanced.

In the aspect described above, for example, the information notification system may further include an apparatus information manager which manages apparatus information related to one or more terminal apparatuses owned by the user, the apparatus information may include output portion information indicating whether or not the terminal apparatus includes an output portion capable of informing the notification information to the user and whether or not the output portion has an alarm function which emits an alarm to the user, the behavior information may further include information on a typical wakeup time of the user and a time required from waking up to departure by the user, in the judging step, it may be judged whether or not the time required from waking up to departure by the user included in the behavior information is longer than a difference between the determined today's departure time and the typical wakeup time of the user included in the behavior information, in the notifying step, when it is judged that the time required from waking up to departure by the user is longer than the difference between the determined today's departure time and the typical wakeup time of the user, an instruction to advance a set time of the alarm function may be notified as the notification information to a terminal apparatus including the output portion having the alarm function, and in the output step, a set time of the alarm function of the terminal apparatus may be advanced in accordance with contents of the notified instruction.

According to the present aspect, when it is judged that the time required from waking up to departure of the user is longer than a difference between the determined today's departure time and a typical departure time, a terminal apparatus including an output portion having an alarm function is notified of an instruction to advance a set time of the alarm function as notification information. The set time of the alarm function of the terminal apparatus is advanced according to contents of the notified instruction. Therefore, when the departure time needs to be advanced, a wakeup time of the user can be advanced.

Embodiment

Hereinafter, respective embodiments of the present disclosure will be described with reference to the drawings. It should be noted that same reference symbols are used to denote same components in the respective drawings.

Figure 33A:
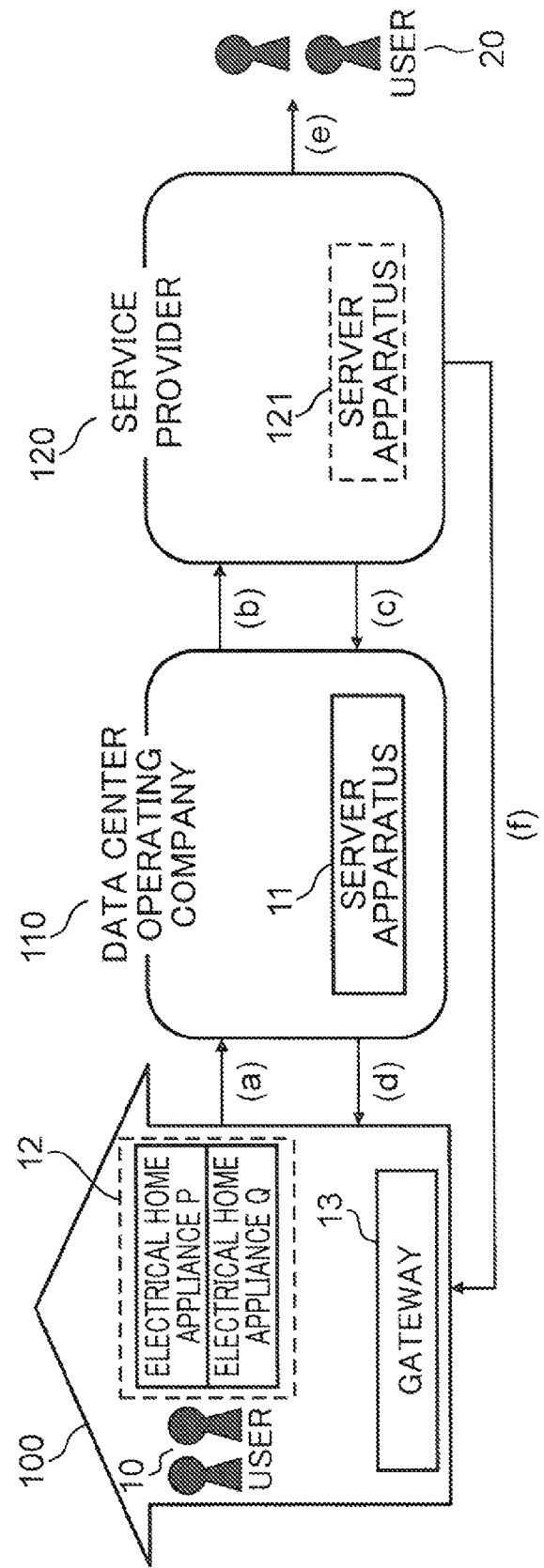
FIG. 33A shows an overview of a system according to the first to fourth embodiments.

FIG. 33A is a diagram showing an overview of an information notification system according to the present embodiment.

A group 100 is, for example, a corporation, an organization, and a home and may be of any size. The group 100 includes electrical home appliances 12 (for example, an electrical home appliance A and an electrical home appliance B) and a gateway 13. The electrical home appliances 12 include devices capable of connecting to the Internet (for example, a smartphone, a personal computer, and a television receiver). In addition, the electrical home appliances 12 include devices incapable of connecting to the Internet by themselves (for example, a lighting fixture, a washing machine, and a refrigerator). The electrical home appliances 12 may also include devices that become capable of connecting to the Internet via the gateway 13 even though the devices are incapable of connecting to the Internet by themselves. In addition, the group 100 includes a user 10 who uses the electrical home appliances 12.

A data center operating company 110 includes a server apparatus 11. The server apparatus 11 is a virtual server that links with various devices via the Internet. The server apparatus 11 mainly manages huge amount of data (big data) and the like which are difficult to handle using general database management tools or the like. The data center operating company 110 operates a data center that manages data, manages the server apparatus 11, and the like. Details of services provided by the data center operating company 110 will be described later.

In this case, the data center operating company 110 is not limited to a company which simply operates a data center that manages data, manages the server apparatus 11, and the like.

Figure 33B:
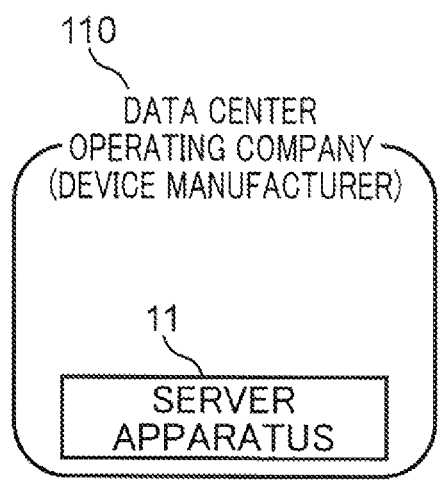
FIG. 33B shows an example of a data center operating company shown in FIG. 33A.
Figure 33C:
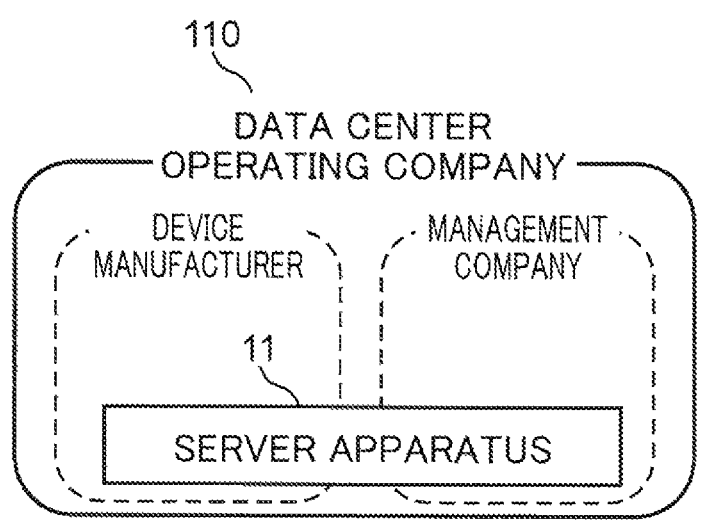
FIG. 33C shows an example of the data center operating company shown in FIG. 33A.

FIGS. 33B and 33C are diagrams showing an example of the data center operating company 110 shown in FIG. 33A. For example, when a device manufacturer responsible for developing and manufacturing a device among the electrical home appliances 12 also manages data or manages the server apparatus 11, the device manufacturer corresponds to the data center operating company 110 (FIG. 33B). In addition, the data center operating company 110 is not limited to one company. For example, when a device manufacturer and a separate management company manage data or manage the server apparatus 11 in cooperation or in a shared manner, both of or one of the device manufacturer and the management company correspond to the data center operating company 110 (FIG. 33C).

The service provider 120 includes a server apparatus 121. The server apparatus 121 as referred to herein may be of any scale and includes, for example, a memory in a personal computer used by an individual. In addition, there may be cases where the service provider 120 does not include the server apparatus 121. In this case, the service provider 120 may own a separate apparatus that fulfills similar functions as the server apparatus 121.

Moreover, in the information notification system described above, the gateway 13 is not essential. The gateway 13 is an apparatus that enables the electrical home appliances 12 to connect to the Internet. Therefore, the gateway 13 is not required when, for example, there are no devices that are incapable of connecting to the Internet by themselves such as when all electrical home appliances 12 in the group 100 are connected to the Internet.

Next, a flow of information in the information notification system described above will now be described with reference to FIG. 33A.

First, the electrical home appliance 12 in the group 100 such as the electrical home appliance A or the electrical home appliance B transmits respective pieces of log information to the server apparatus 11 of the data center operating company 110. The server apparatus 11 accumulates log information of the electrical home appliance A or the electrical home appliance B (arrow (a) in FIG. 33A). In this case, for example, log information is information indicating an operation state, an operation date/time, or the like of the electrical home appliances 12. Examples include a viewing history of a television receiver, video recording reservation information of a recorder, an operation date/time of a washing machine, an amount of laundry, an opening/closing time/date of a refrigerator, and the number of times a refrigerator had been opened/closed. Log information is not limited to such information and refers to all information that can be acquired from all electrical home appliances 12.

The log information may be directly provided by the electrical home appliances 12 themselves to the server apparatus 11 via the Internet. Alternatively, the log information may be temporarily accumulated in the gateway 13 by the electrical home appliances 12 and subsequently provided to the server apparatus 11 by the gateway 13.

Next, the server apparatus 11 of the data center operating company 110 provides the accumulated log information to the service provider 120 in fixed units. In this case, a "fixed unit" may be a unit that can be provided by the data center operating company 110 to the service provider 120 by organizing accumulated information or a unit that is requested by the service provider 120. While the term "fixed unit" is used, the amount of information need not be fixed. For example, there may be cases where the amount of information to be provided varies according to circumstances. When necessary, the log information is stored in a server apparatus 121 owned by the service provider 120 (arrow (b) in FIG. 33A).

Subsequently, the service provider 120 organizes the log information into information matching a service to be provided to the user and provides the organized information to the user. The user who is a provision object may be the user 10 using the electrical home appliances 12 or an outside user 20. As for a method of providing information to a user, for example, the information may be directly provided to the user 10 or 20 by the service provider 120 (arrows (b) and (e) in FIG. 33A). Alternatively, as for a method of providing service to a user, for example, the service may be provided to the user 10 once again via the server apparatus 11 of the data center operating company 110 (arrows (c) and (d) in FIG. 33A). Furthermore, the server apparatus 11 of the data center operating company 110 may organize the log information into information matching the service to be provided to the user and provide the organized information to the service provider 120.

Moreover, the user 10 may differ from the user 20 or may be the same as the user 20.

First Embodiment 1.1 Configuration of Information Notification System

FIG. 1 is a diagram showing an example of a configuration of an information notification system according to a first embodiment. As shown in FIG. 1, the information notification system according to the first embodiment includes a server apparatus 101 and one or more terminal apparatuses 102.

In FIG. 1, the one or more terminal apparatuses 102 are positioned inside a house. The one or more terminal apparatuses 102 are respectively connected to the network directly, via a router apparatus (not shown), or via a gateway (for example, the gateway 13 shown in FIG. 33A). Examples of the terminal apparatus 102 include air conditioning devices such as an air conditioner, AV devices such as a television receiver (hereinafter, referred to as a "television"), electrical home appliances used in a kitchen such as a refrigerator, a microwave oven, and a rice cooker, as well as a washing machine, an electronic washstand, a lighting fixture, an electronic shutter device, an intercom, a smartphone, and a tablet apparatus. The one or more terminal apparatuses 102 include one or more notifying apparatuses 103. The terminal apparatus 102 corresponds to, for example, the electrical home appliance 12 shown in FIG. 33A.

The server apparatus 101 accumulates and manages a use history of the terminal apparatuses 102 inside the house, a behavior history of the user that is uploaded by a sensor (not shown) installed inside the house, and the like. The server apparatus 101 acquires today's required time that corresponds to a behavior pattern of the user from an external system possessing operation information of public transportation means or vehicular traffic congestion information. Based on the acquired today's required time and the behavior pattern of the user, the server apparatus 101 transmits notification information, which prompts the user to depart earlier than usual for example, to the notifying apparatus 103.

The notifying apparatus 103 receives notification information from the server apparatus 101. The notifying apparatus 103 notifies (presents) the received notification information to the user. When the user indicates that the notification information has been confirmed, the notifying apparatus 103 transmits information to that effect (user confirmation) to the server apparatus 101.

1.2 Configuration of Server Apparatus 101

Figure 2:
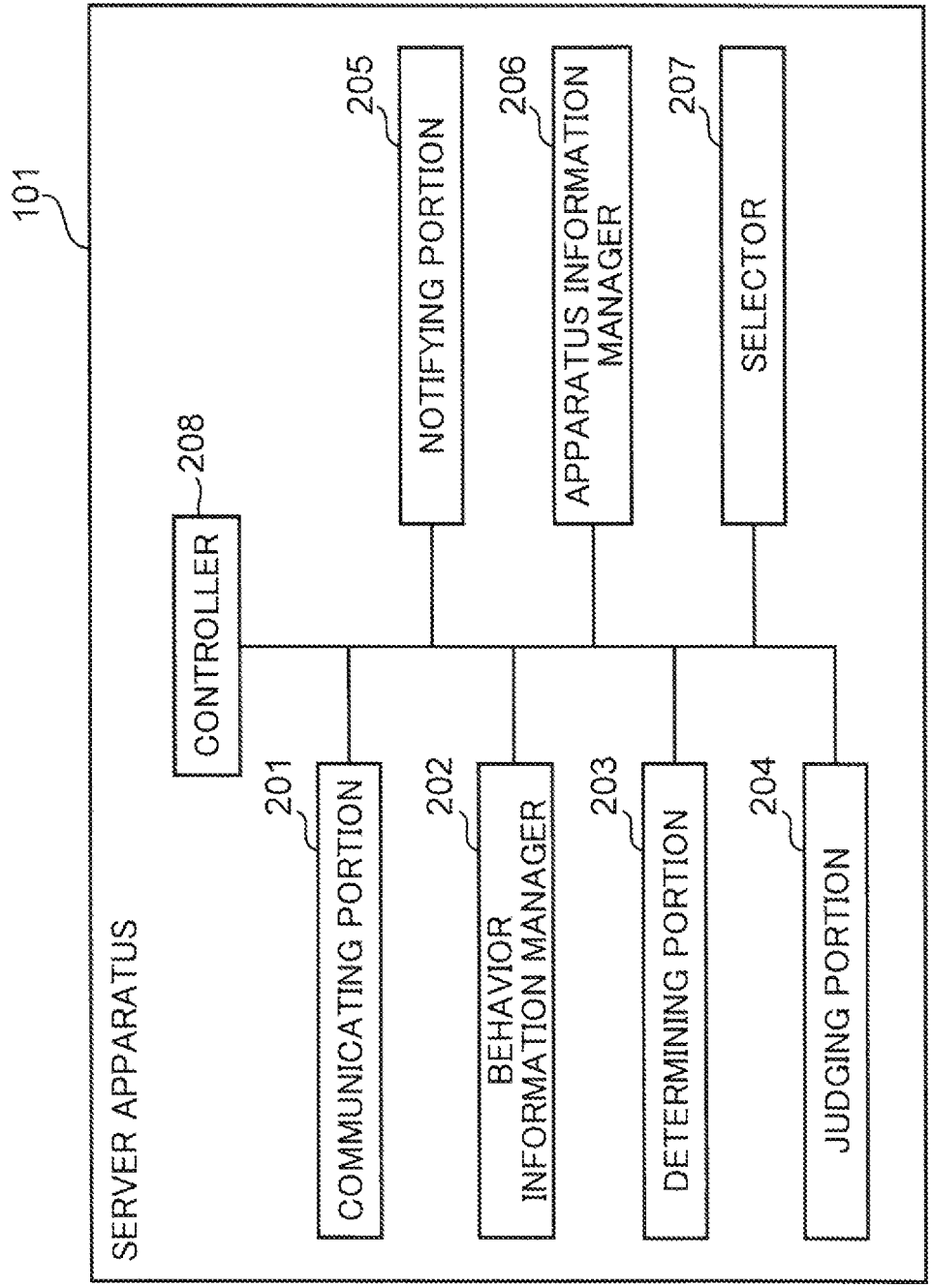
FIG. 2 is a configuration diagram of a server apparatus according to the first embodiment.

FIG. 2 is a block diagram showing an example of a configuration of the server apparatus 101 shown in FIG. 1. A detailed configuration of the server apparatus 101 will now be described with reference to FIG. 2.

As shown in FIG. 2, the server apparatus 101 includes a communicating portion 201, a behavior information manager 202, a determining portion 203, a judging portion 204, a notifying portion 205, an apparatus information manager 206, a selector 207, and a controller 208.

The server apparatus 101 is constituted by a microprocessor, a RAM, a ROM, a hard disk, and the like which are not specifically illustrated. A computer program is stored in the RAM, the ROM, and the hard disk. The server apparatus 101 performs the respective functions shown in FIG. 2 as the microprocessor operates in accordance with the program.

The respective functional blocks of the server apparatus 101 including the communicating portion 201, the behavior information manager 202, the determining portion 203, the judging portion 204, the notifying portion 205, the apparatus information manager 206, the selector 207, and the controller 208 are typically realized by an LSI that is an integrated circuit. The respective functional blocks may be individually configured as single chips. Alternatively, the respective functional blocks may be configured as single chips so as to include one or more functional blocks or to include a part of the respective functional blocks.

While an LSI has been cited herein, other terms such as an IC, a system LSI, a super LSI, or an ultra LSI may be used depending on degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may also be used.

Moreover, if techniques for realizing circuit integration to replace LSIs should emerge due to progress made in semiconductor technology or due to derivative technology, it is obvious that the functional blocks may be integrated using such techniques. One potential candidate of such a technique is the application of bio-technology.

Finally, each functional block may be realized by software or by a combination of an LSI and software. In addition, the software may be tamper resistant.

The behavior information manager 202 manages behavior information related to the behavior of the user. For example, the behavior information manager 202 accumulates and manages a use history of the terminal apparatuses 102 inside the house and a behavior history of the user that is uploaded by a sensor (not shown) installed inside the house. Furthermore, the behavior information manager 202 acquires GPS information of a terminal apparatus 102 which is carried by the user such as a smartphone, a tablet apparatus, or a smart watch in order to accumulate and manage a behavior history of the user outside of the house. The behavior information manager 202 generates a behavior pattern of the user from the behavior history which is accumulated on a daily basis. Behavior information which is related to the behavior of the user and which is managed by the behavior information manager 202 will now be described with reference to FIGS. 3 and 4.

FIG. 3 is a diagram showing an example of a behavior history 500 of the user which is managed by the behavior information manager 202. The behavior information manager 202 accumulates and manages time information related to everyday movement and the like as the behavior history 500 (an example of behavior information). As shown in FIG. 3, the behavior history 500 includes a user ID, an address, a date, a departure time, a return time, an arrival point (destination), an arrival time, and transportation means.

A "user ID" is a unique identifier for identifying a user. An "address" represents an address of the user's home. A "departure time" represents the time at which the user had left home. A "return time" represents the time at which the user had returned home. An "arrival point (destination)" represents an address of a destination in case of departure by the user from the user's home. An "arrival time" represents the time at which the user had arrived at the destination after leaving home. "Transportation means" represents transportation means which the user had used to travel from home to the destination.

The example in FIG. 3 shows that a user with a user ID of "98765" had left home at "7:30" on "Apr. 4, 2013", returned home at "21:00", arrived at a workplace (destination) at "3-2-1 Y Town, X City" at "8:13", and a "train" had been used as the transportation means to arrive at the workplace. Alternatively, the behavior history 500 shown in FIG. 3 may be configured so as to include a wakeup time of the user in a similar manner to a behavior history 2300 (FIG. 22) to be described later.

FIG. 4 is a diagram showing an example of a behavior pattern 400 of the user which is managed by the behavior information manager 202. The behavior information manager 202 generates a behavior pattern 400 (an example of behavior information) of the user from the behavior history 500 of the user. As shown in FIG. 4, the behavior pattern 400 includes a user ID, a typical weekday behavior pattern, and a typical weekend behavior pattern.

In the example shown in FIG. 4, on weekdays, a user with a user ID of "98765" travels to a destination "3-2-1 Y Town, X City" on a train. FIG. 4 shows that a typical weekday behavior pattern is a behavior pattern including "getting up at 6:30, leaving home at 7:30, and arriving at the workplace at 8:15" and "leaving the workplace at 20:00, arriving at home at 20:30, and going to bed at 23:00".

In addition, on weekends, the same user travels by car to a destination "2-2-2 E Town, D City". FIG. 4 shows that a typical weekend behavior pattern is a behavior pattern including "getting up at 9:00, leaving home at 10:00, and arriving at a gym at 10:30" and "leaving the gym at 13:30, arriving at home at 14:00, and going to bed at 23:00".

The behavior information manager 202 calculates an average value for a prescribed period of time (for example, one month) from the accumulated behavior history 500 of the user and generates a typical behavior pattern. For example, as return times on weekdays, FIG. 3 shows data for two days: "21:00" and "20:20". The behavior information manager 202 calculates an average value of the return times over one month and provides a "return time" of "20:30" as shown in FIG. 4.

Returning now to FIG. 2, based on an address of home, and a departure time, a destination and transportation means in accordance with a typical behavior pattern, which are managed by the behavior information manager 202, the communicating portion 201 acquires a required time from the house (departure point) to a destination on that day from the external system.

The external system is, for example, a server owned by a service provider which performs service involving collecting information related to traffic such as an operation condition of transportation means and vehicular traffic congestion information of roads and providing the collected information. The service provider collects information related to traffic from, for example, a railway company, an expressway company, and a road traffic information communication system and accumulates the information in the server. In addition, the service provider provides a service of calculating today's required time which is required to travel from a departure point to a destination using the collected information related to traffic.

The communicating portion 201 transmits information such as an address of a house, a departure time in accordance with a typical behavior pattern, a destination, and transportation means which are managed by the behavior information manager 202 to the external system. Using the information from the communicating portion 201 and the information related to traffic, the external system calculates today's required time which is required to travel from home to the destination. The external system transmits the calculated required time to the communicating portion 201.

For instance, in the example of the behavior pattern 400 shown in FIG. 4, when that day is a weekday, the communicating portion 201 uses traveling by train from a home address "5-4-3 B Town, A City" to a destination "3-2-1 Y Town, X City" and an arrival at "8:15" as guides and acquires a required time in accordance with the operation conditions on that day from the external system. In addition, when traveling by car, the communicating portion 201 acquires a required time in accordance with vehicular traffic congestion information on that day from the external system.

Furthermore, the communicating portion 201 transmits notification information such as a suggested departure time on that day to the notifying apparatus 103. In addition, the communicating portion 201 transmits a delete instruction for deleting notification information from the notifying apparatus 103 to the notifying apparatus 103. Furthermore, the communicating portion 201 receives a user confirmation indicating that the user has confirmed the notification information from the notifying apparatus 103.

Based on the required time from home to the destination on that day acquired by the communicating portion 201, the determining portion 203 determines a departure time that enables the user to be in time for the time the user should arrive at the destination on that day.

The judging portion 204 judges whether or not the departure time on that day determined by the determining portion 203 is earlier than the departure time in the typical behavior pattern which is managed by the behavior information manager 202.

The apparatus information manager 206 manages apparatus information regarding the terminal apparatuses 102 for each type among the one or more terminal apparatuses 102 present in a same house. A specific example of apparatus information will now be described with reference to FIG. 5.

FIG. 5 is a diagram showing an example of apparatus information 600. As shown in FIG. 5, the apparatus information 600 includes a type, a terminal apparatus ID, a presence or absence of an output portion (an example of output portion information), and a power status (an example of power information).

A "type" represents a type of a terminal apparatus. A "terminal apparatus ID" is a unique identifier for identifying a terminal apparatus. A "presence or absence of an output portion" represents whether or not a terminal apparatus includes an output portion. A terminal apparatus including an output portion corresponds to a notifying apparatus. A terminal apparatus which does not include an output portion does not correspond to a notifying apparatus. A "power status" represents whether power supply of a terminal apparatus is on or off.

The example in FIG. 5 shows that a type "television" has a terminal apparatus ID "1234567", includes an output portion, and power supply thereof is currently on. In addition, the example in FIG. 5 shows that a type "refrigerator" has a terminal apparatus ID "8957328", does not include an output portion, and the power supply is currently on.

In the apparatus information 600 shown in FIG. 5, when an output portion is included (in other words, when a terminal apparatus corresponds to a notifying apparatus), the "presence or absence of an output portion" indicates a function included in the output portion. In the example shown in FIG. 5, the output portion included in the type "television" has a display function. An output portion included in the type "microwave oven" has a display function and a function for emitting a buzzer tone. In other words, the terminal apparatus of the type "microwave oven" is capable of displaying text and images to the user due to the display function and capable of attracting attention of the user due to the function for emitting a buzzer tone. An output portion included in the type "smartphone" has a display function and a vibration function. In other words, the terminal apparatus of the type "smartphone" is capable of displaying text and images to the user due to the display function and capable of emitting an alarm to the user due to the vibration function.

Returning now to FIG. 2, the notifying portion 205 transmits notification information including a suggested departure time to the notifying apparatus 103 via the communicating portion 201. A specific example of notification information will be described later.

The selector 207 uses the apparatus information 600 managed by the apparatus information manager 206 to select all notifying apparatuses 103 whose power supply is currently on from the one or more terminal apparatuses 102. In the example shown in FIG. 5, the selector 207 selects three notifying apparatuses 103 of the types "television", "smartphone", and "intercom".

The controller 208 realizes the functions of the server apparatus 101 by managing and controlling the communicating portion 201, the behavior information manager 202, the determining portion 203, the judging portion 204, the notifying portion 205, the apparatus information manager 206, and the selector 207 described above.

1.3 Configuration of Notifying Apparatus 103

Figure 6:
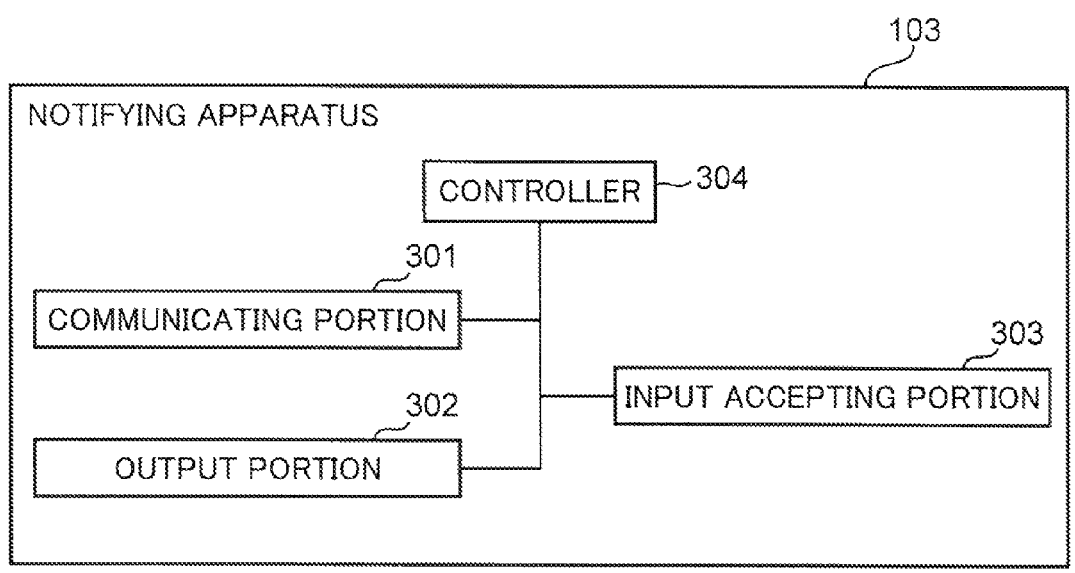
FIG. 6 is a configuration diagram of a notifying apparatus according to the first embodiment.

FIG. 6 is a block diagram showing an example of a configuration of the notifying apparatus 103 shown in FIG. 1. A detailed configuration of the notifying apparatus 103 will now be described with reference to FIG. 6.

As shown in FIG. 6, the notifying apparatus 103 includes a communicating portion 301, an output portion 302, an input accepting portion 303, and a controller 304.

The notifying apparatus 103 is constituted by a microprocessor, a RAM, a ROM, a hard disk, and the like which are not specifically illustrated. A computer program is stored in the RAM, the ROM, and the hard disk. The notifying apparatus 103 performs the respective functions shown in FIG. 6 as the microprocessor operates in accordance with the program.

Moreover, the respective functional blocks of the notifying apparatus 103 including the communicating portion 301, the output portion 302, the input accepting portion 303, and the controller 304 are typically realized by an LSI that is an integrated circuit. The respective functional blocks may be individually configured as single chips. Alternatively, the respective functional blocks may be configured as single chips so as to include one or more functional blocks or to include a part of the respective functional blocks.

While an LSI has been cited herein, other terms such as an IC, a system LSI, a super LSI, or an ultra LSI may be used depending on degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may also be used.

Moreover, if techniques for realizing circuit integration to replace LSIs should emerge due to progress made in semiconductor technology or due to derivative technology, it is obvious that the functional blocks may be integrated using such techniques. One potential candidate of such a technique is the application of bio-technology.

Finally, each functional block may be realized by software or by a combination of an LSI and software. In addition, the software may be tamper resistant.

The communicating portion 301 receives notification information including a suggested departure time for that day from the server apparatus 101. The communicating portion 301 receives, from the server apparatus 101, a delete instruction that instructs to delete the notification information received from the server apparatus 101. In addition, the communicating portion 301 transmits an input by the user accepted by the input accepting portion 303 or, in other words, a user confirmation indicating that the user has confirmed the notification information to the server apparatus 101.

The output portion 302 outputs the notification information received by the communicating portion 301. In addition, in accordance with the delete instruction to delete the notification information received via the communicating portion 301, the output portion 302 deletes the notification information being outputted. For example, when the output portion 302 includes a display function, the output portion 302 displays a notifying image based on the notification information. When the delete instruction is received via the communicating portion 301, the output portion 302 erases the notifying image being displayed. For example, when the output portion 302 includes a sound outputting function, the output portion 302 outputs a notification sound based on the notification information. When the delete instruction is received via the communicating portion 301, the output portion 302 stops the output of the notification sound. A specific example of notification information will now be described with reference to FIGS. 7 and 8.

Figure 7:
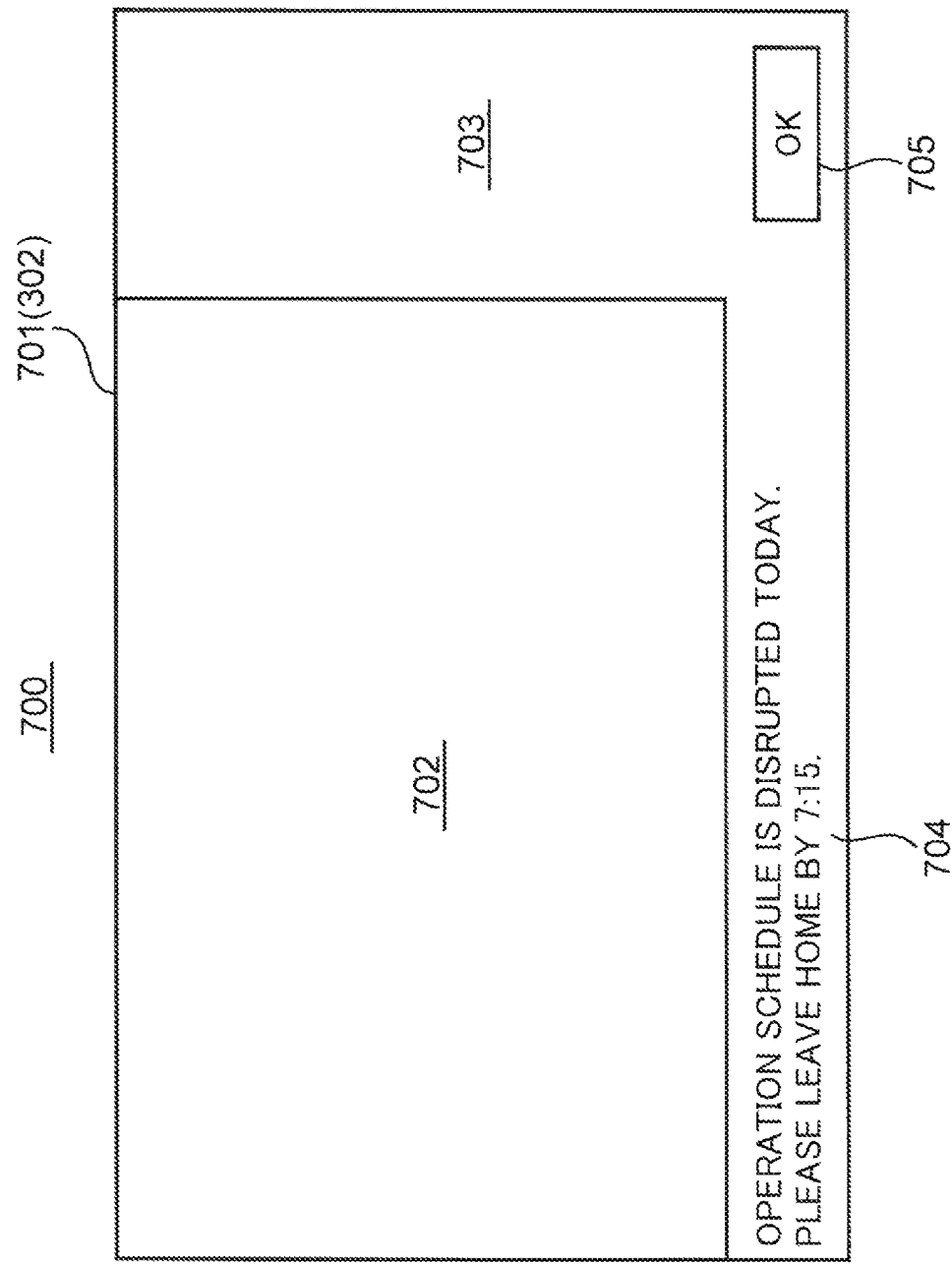
FIG. 7 shows an example of a notifying image based on notification information according to the first embodiment.
Figure 8:
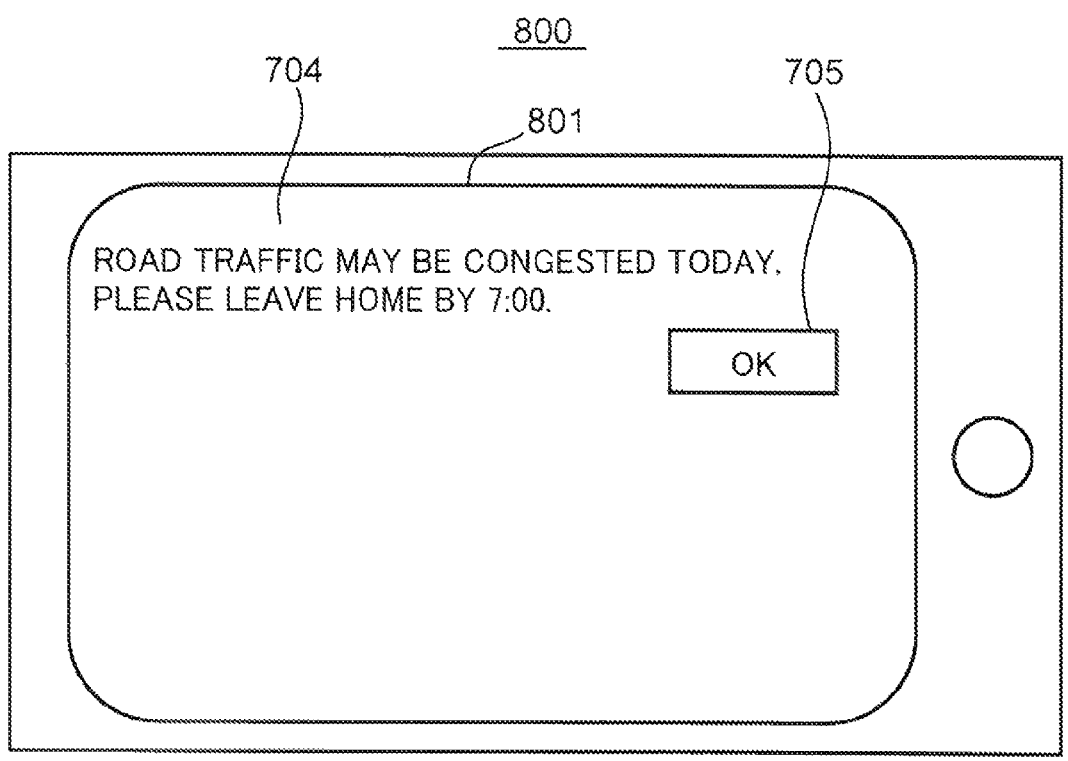
FIG. 8 shows an example of a notifying image based on notification information according to the first embodiment.
Figure 9:
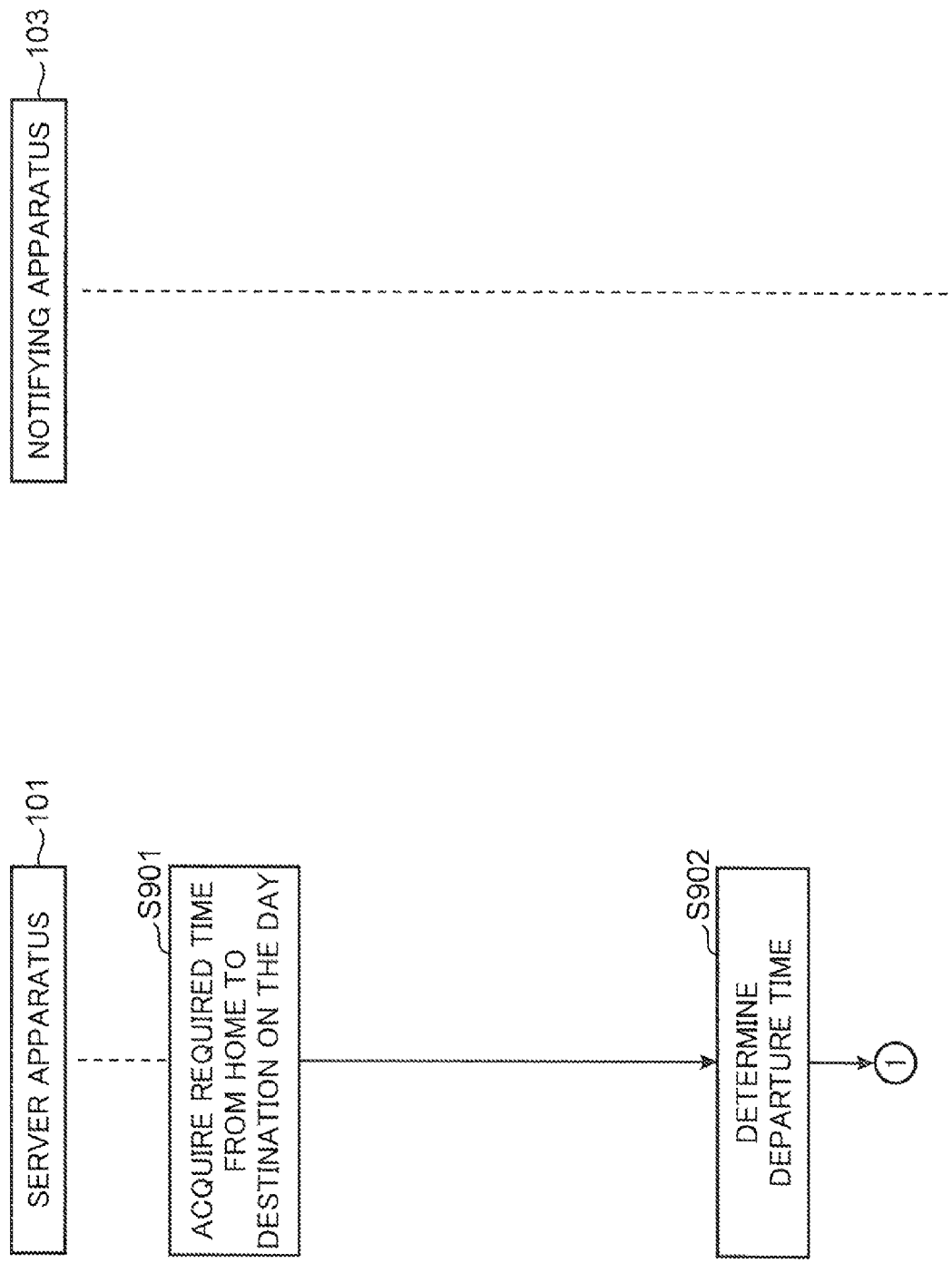
FIG. 9 is a flow chart of operations according to the first embodiment.
Figure 10:
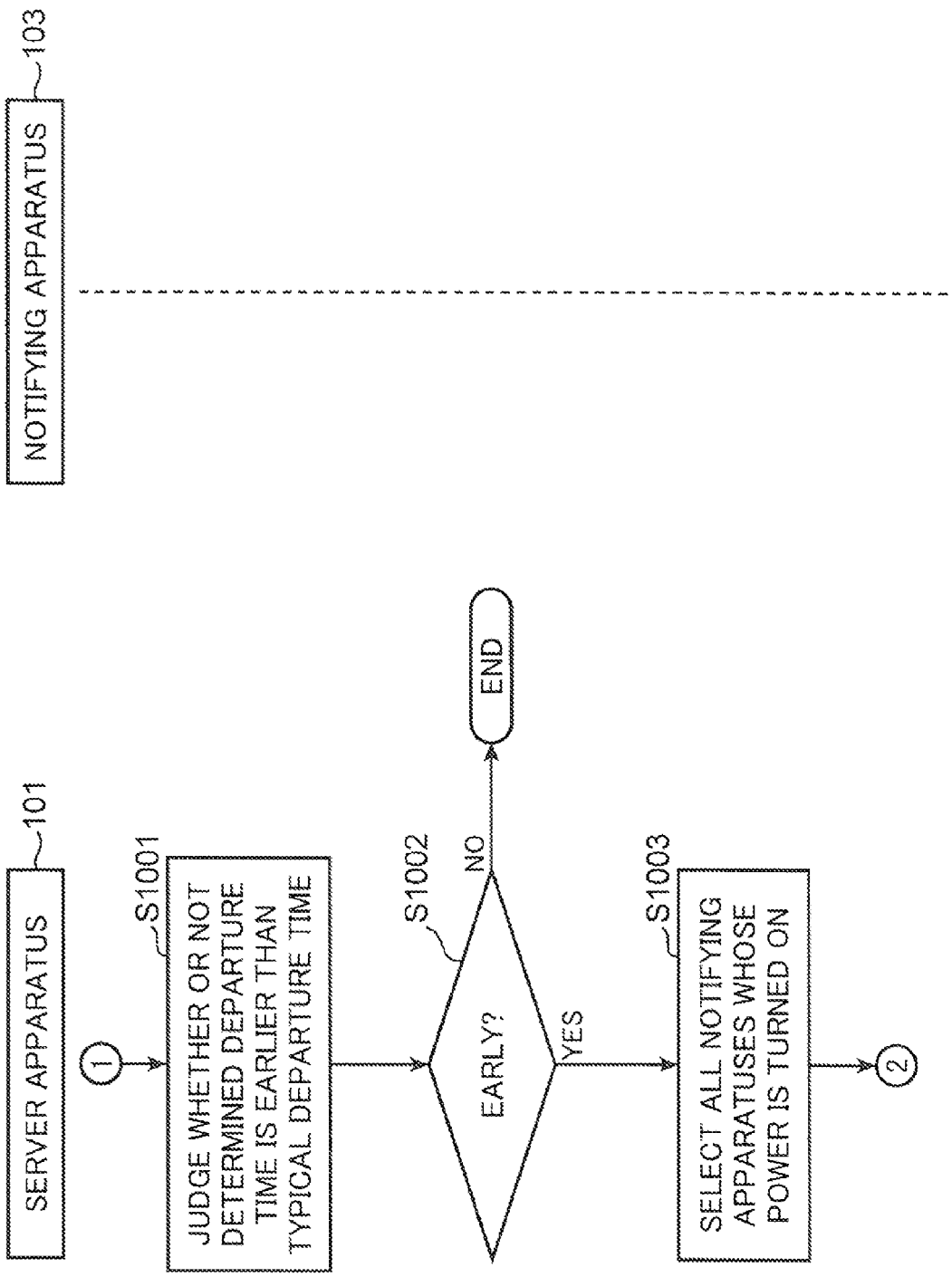
FIG. 10 is a flow chart of operations according to the first embodiment.
Figure 11:
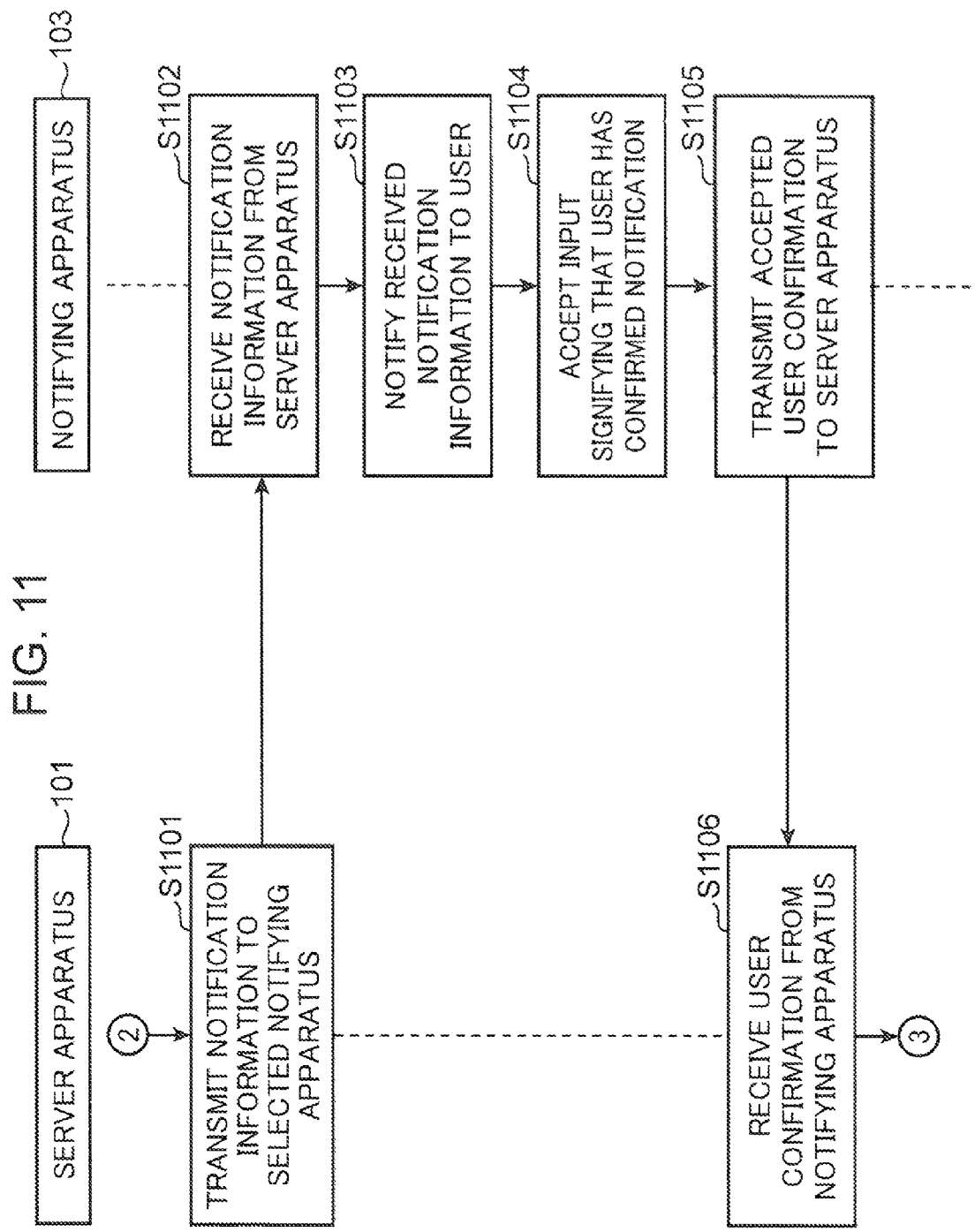
FIG. 11 is a flow chart of operations according to the first embodiment.
Figure 12:
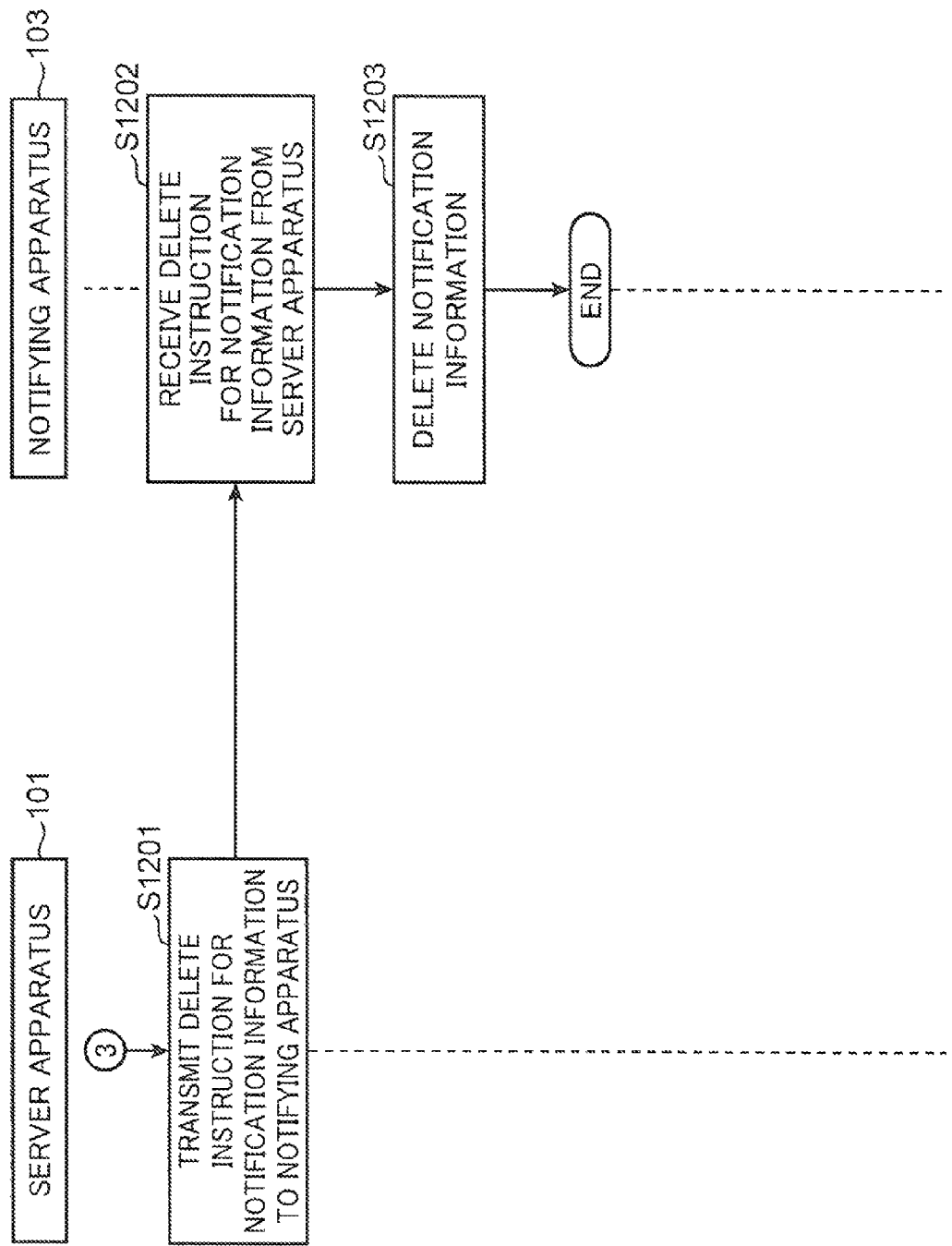
FIG. 12 is a flow chart of operations according to the first embodiment.

FIGS. 7 and 8 are diagrams showing an example of a notifying image based on notification information. In FIG. 7, a notifying image 704 based on notification information is displayed on a display 701 (corresponding to the output portion 302 shown in FIG. 6) of a television 700 (an example of the notifying apparatus 103). As shown in FIG. 7, the display 701 of the television is divided into a display region 702 and a display region 703. A television broadcast program is displayed in the display region 702. The notifying image 704 based on notification information is displayed in the display region 703. In FIG. 7, a confirmation button 705 is further displayed in the display region 703.

In the example shown in FIG. 7, a notifying image 704 reading "The operation schedule is disrupted today. Please leave home by 7:15." is displayed in the display region 703. Accordingly, the fact that the operation schedule of trains is disrupted and a suggested departure time are notified to the user. The confirmation button 705 is a button used to indicate that the user has confirmed the notifying image 704.

In FIG. 8, a notifying image 704 and a confirmation button 705 are displayed on a display 801 (corresponding to the output portion 302 shown in FIG. 6) of a smartphone 800 (an example of the notifying apparatus 103). In the example shown in FIG. 8, the notifying image 704 reading "The road may be congested today. Please leave home by 7:00." is displayed on the display 801. Accordingly, the fact that congestion may occur when traveling by car and a suggested departure time are notified to the user.

Returning now to FIG. 6, the input accepting portion 303 accepts an input by the user indicating that the user has confirmed the notification information output by the output portion 302.

In the example shown in FIG. 7 in which the notifying image 704 is displayed on the television 700, a remote controller of the television 700 may be used as the input accepting portion 303. For example, by operating up, down, left, and right buttons, the user may move a cursor on top of the confirmation button and operate a decide button. In the example shown in FIG. 8 in which the notifying image 704 is displayed on the smartphone 800, a touch panel of the smartphone 800 may be used as the input accepting portion 303. For example, the user may tap the confirmation button 705 with a finger.

The controller 304 realizes functions of the notifying apparatus 103 by managing and controlling the communicating portion 301, the output portion 302, and the input accepting portion 303.

1.4 Configuration of Information Notification System

FIGS. 9 to 12 are flow charts showing examples of operations in a case where the server apparatus 101 transmits notification information including a departure time and the like to one or more notifying apparatuses 103 according to the first embodiment.

Based on an address of home, and a departure time, a destination and transportation means in accordance with a typical behavior pattern, which are managed by the behavior information manager 202, the communicating portion 201 of the server apparatus 101 acquires a required time from home to a destination on that day from the external system (step S901, an example of the acquiring step).

The determining portion 203 determines a departure time that enables the user to be in time for the time the user should arrive at the destination on that day based on the required time from home to the destination on that day as acquired by the communicating portion 201, and on a departure time and an arrival time in accordance with a typical behavior pattern which is managed by the behavior information manager 202 (step S902, an example of the determining step).

In the example shown in FIG. 4, in a typical weekday behavior pattern, the departure time from home is 7:30 and the arrival time at the workplace is 8:15. Therefore, according to this behavior pattern, an ordinary required time is 45 minutes. In contrast, if the required time acquired in step S901 is, for example, 55 minutes, today's required time is longer than the required time in the behavior pattern by 10 minutes. Therefore, in step S902, the determining portion 203 determines the departure time to be 7:20 that is 10 minutes earlier than the behavior pattern.

The judging portion 204 judges whether or not the departure time determined by the determining portion 203 is earlier than the departure time in the typical behavior pattern which is managed by the behavior information manager 202 (step S1001, an example of the judging step). When the judging portion 204 judges that the determined departure time is not earlier than the departure time in the typical behavior pattern (NO in step S1002), the controller 208 ends the process without performing any operation.

When the judging portion 204 judges that the determined departure time is earlier than the departure time in the typical behavior pattern (YES in step S1002), the selector 207 selects all notifying apparatuses 103 whose power supply is currently on from the one or more notifying apparatuses 103 managed by the apparatus information manager 206 (step S1003, an example of the selecting step).

The notifying portion 205 transmits notification information including a departure time and the like to the notifying apparatus 103 via the communicating portion 201 (step S1101, an example of the notifying step). The communicating portion 301 of the notifying apparatus 103 receives notification information including a suggested departure time for that day from the server apparatus 101 (step S1102). The output portion 302 notifies notification information received by the communicating portion 301 to the user (step S1103, an example of the output step).

In step S1103, the display 701 (corresponding to the output portion 302 in FIG. 6) displays the notifying image 704 including a suggested departure time, in FIG. 7. The example in FIG. 7 shows the suggested departure time to be 7:15. On the other hand, in the typical weekday behavior pattern shown in FIG. 4, the arrival time at the workplace is 8:15. Therefore, it is shown that today's required time acquired in step S901 is 1 hour.

The input accepting portion 303 accepts an input by the user indicating that the user has confirmed the notification information output to the output portion 302 (step S1104, an example of the input accepting step). In step S1104, the input accepting portion 303 senses that the confirmation button 705 has been tapped by the user, in FIG. 8 for example.

The communicating portion 301 transmits an input by the user accepted by the input accepting portion 303 or, in other words, transmits a user confirmation indicating that the user has confirmed the notification information to the server apparatus 101 (step S1105).

The communicating portion 201 of the server apparatus 101 receives a user confirmation indicating that the user has confirmed the notification information from the notifying apparatus 103 (step S1106). The communicating portion 201 transmits, to the notifying apparatus 103 having transmitted the notification information, a delete instruction instructing to delete the notification information from the output portion 302 of the notifying apparatus 103 (step S1201).

The communicating portion 301 of the notifying apparatus 103 receives from the server apparatus 101 a delete instruction instructing to delete the notification information (step S1202). According to the delete instruction of notification information received via the communicating portion 301, the output portion 302 deletes the notification information being output (step S1302, an example of the deleting step). In step S1203, the display 701 (corresponding to output portion 302 in FIG. 6) deletes the notifying image 704 being displayed, in FIG. 7 for example.

As described above, according to the present first embodiment, the communicating portion 201 of the server apparatus 101 acquires today's required time from home to a destination from an external system in accordance with a typical behavior pattern of a user. The determining portion 203 determines a departure time using today's required time which has been acquired. The judging portion 204 judges whether or not the determined departure time is earlier than the departure time in the typical behavior pattern of the user. The selector 207 selects the notifying apparatus 103 whose power supply is currently on using the apparatus information 600. When the determined departure time is earlier than the departure time in the typical behavior pattern of the user, the notifying portion 205 transmits notification information to the selected notifying apparatus 103.

Accordingly, information prompting the user who has woken up to leave home earlier than usual can be presented by the notifying apparatus 103, as the notification information, in accordance with operation information of public transportation means or vehicular traffic congestion information. In addition, a notifying apparatus 103 whose power supply is on has been selected by the selector 207. Therefore, notification information can be presented to the user in a more appropriate manner.

Furthermore, according to the present first embodiment, upon receiving a user confirmation, the communicating portion 201 of the server apparatus 101 transmits a delete instruction to the notifying apparatus 103 having transmitted the notification information. When the communicating portion 301 of the notifying apparatus 103 receives the delete instruction, the output portion 302 deletes the notification information being output according to the delete instruction. Receiving a user confirmation means that the user has confirmed the notification information. Therefore, the notification information being output is no longer required. As a result, as shown in FIG. 7 for example, when the notifying image 704 is being displayed on the display 701 of the television 700, by deleting the notifying image 704 that is no longer required, the notifying image 704 can be prevented from excessively obstructing the television broadcast program.

Second Embodiment 2.1 Configurations of Information Notification System, Server Apparatus 101, and Notifying Apparatus 103.

Configurations of the information notification system, the server apparatus 101, and the notifying apparatus 103 according to a second embodiment are respectively similar to those of the first embodiment shown in FIGS. 1, 2, and 6. The second embodiment will be described while focusing on functions that differ from the first embodiment.

The communicating portion 201 of the server apparatus 101 further acquires, from an external system, a required time from home to a destination on that day when traveling on transportation means that differs from transportation means in accordance with a typical behavior pattern managed by the behavior information manager 202.

For example, in the example of the behavior pattern 400 shown in FIG. 4, trains are the normally used transportation means according to the typical weekday behavior pattern. However, in addition to a case of using the train, the communicating portion 201 acquires a required time in accordance with vehicular traffic congestion information and the like on that day when a car is used to travel from the home address "5-4-3 B Town, A City" to a destination "3-2-1 Y Town, X City" by using arrival at "8:15" as a guide.

The judging portion 204 of the server apparatus 101 further compares a departure time when transportation means (trains in the example shown in FIG. 4) corresponding to the typical behavior pattern is used with a departure time when different transportation means (a car in the example shown in FIG. 4) is used and judges which departure time is later. The judging portion 204 calculates respective departure times based on the arrival time in the typical behavior pattern and the acquired required times when trains are used and when a car is used. The judging portion 204 compares the respective calculated departure times.

A specific example of notification information displayed on the output portion 302 of the notifying apparatus 103 will now be described with reference to FIGS. 13 and 14.

Figure 13:
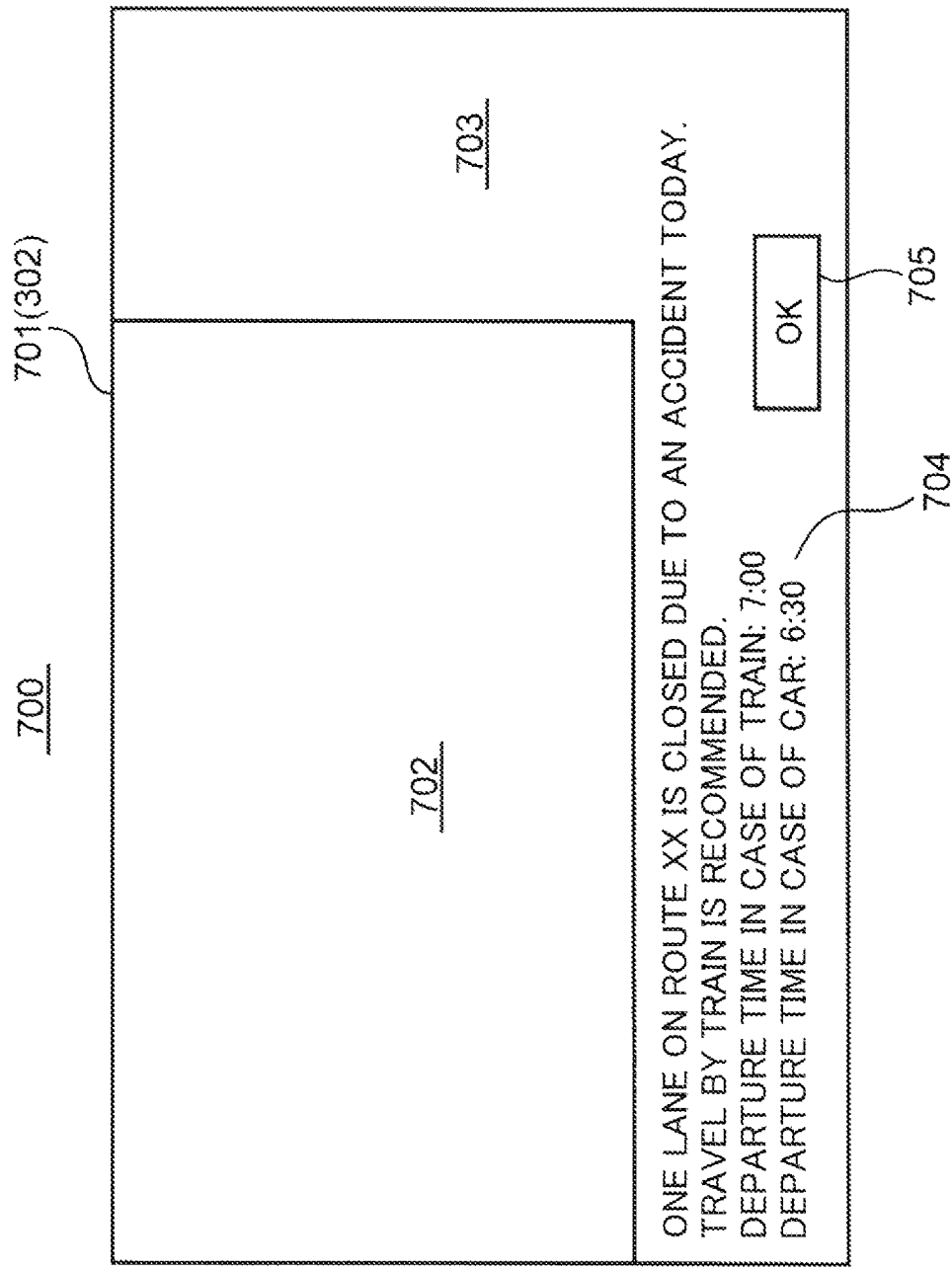
FIG. 13 shows an example of a notifying image based on notification information according to a second embodiment.
Figure 14:
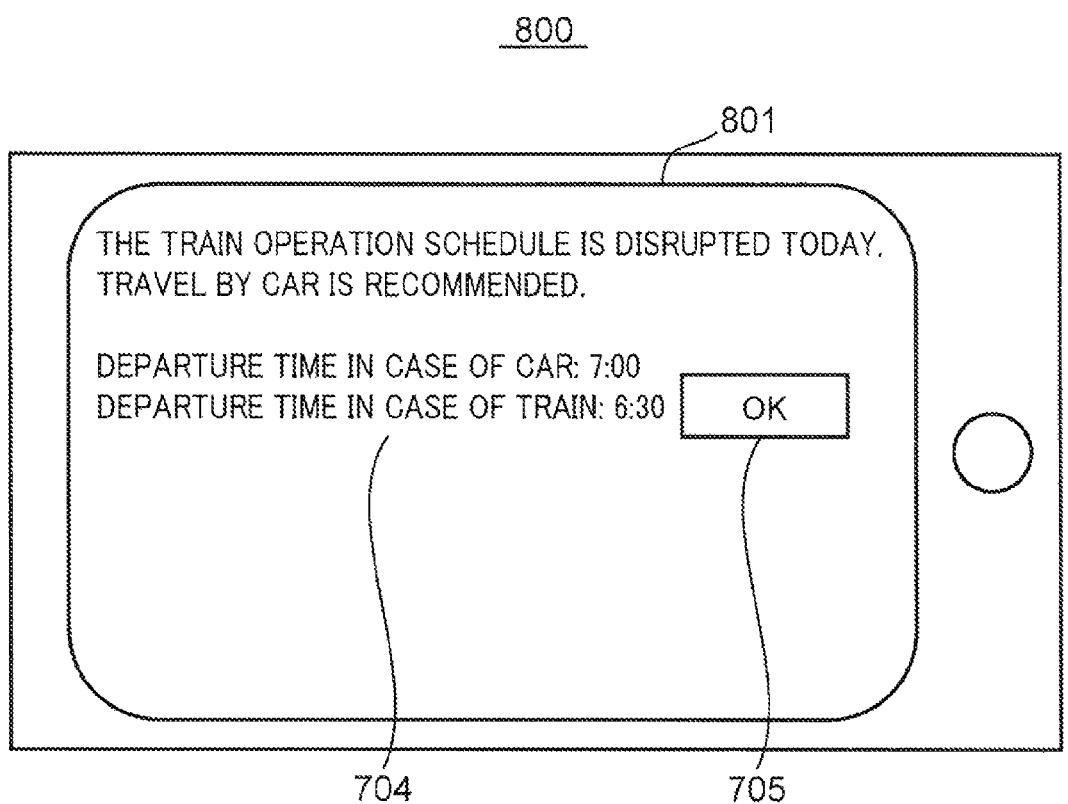
FIG. 14 shows an example of a notifying image based on notification information according to the second embodiment.
Figure 15:
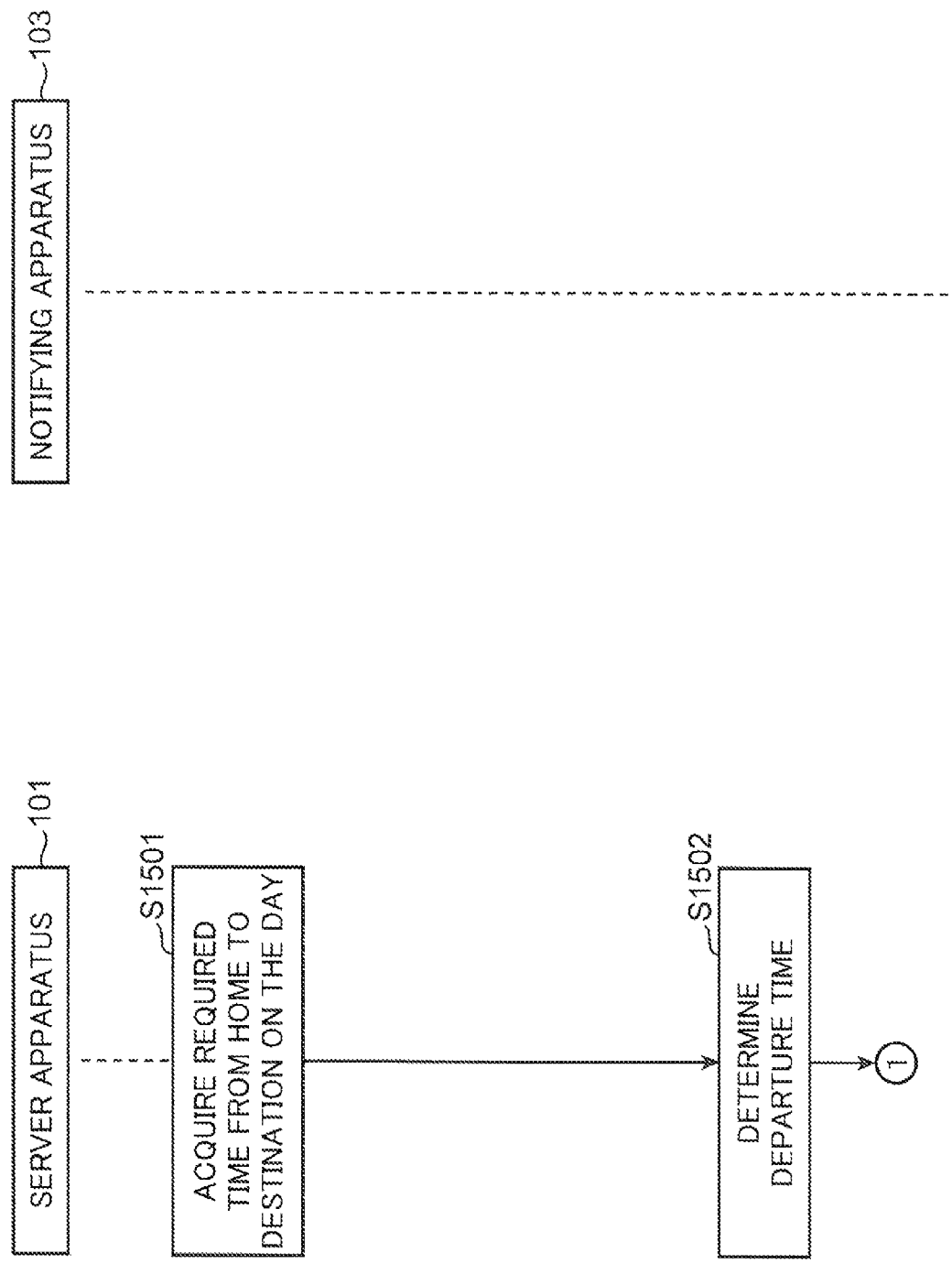
FIG. 15 is a flow chart of operations according to the second embodiment.
Figure 16:
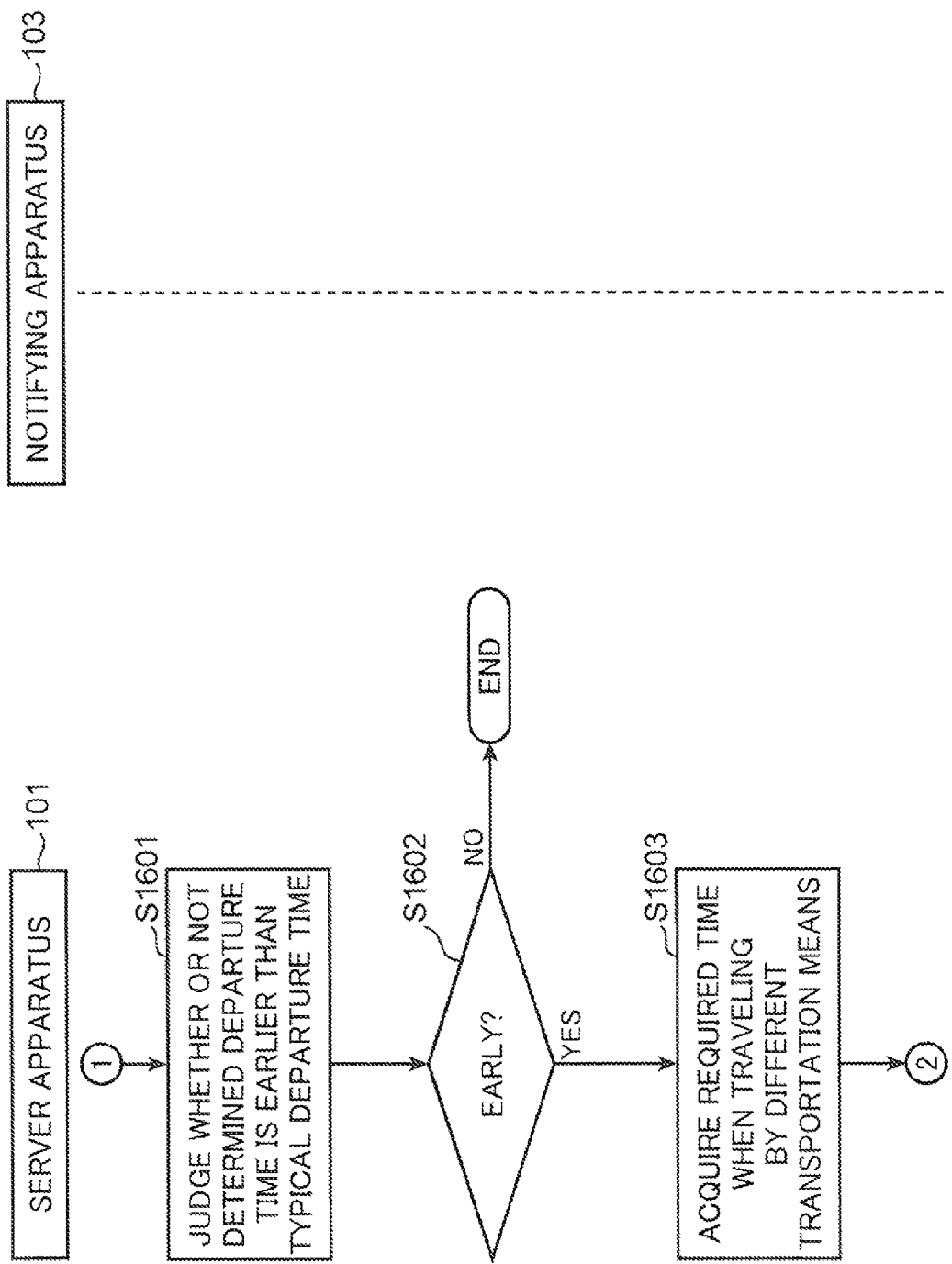
FIG. 16 is a flow chart of operations according to the second embodiment.
Figure 17:
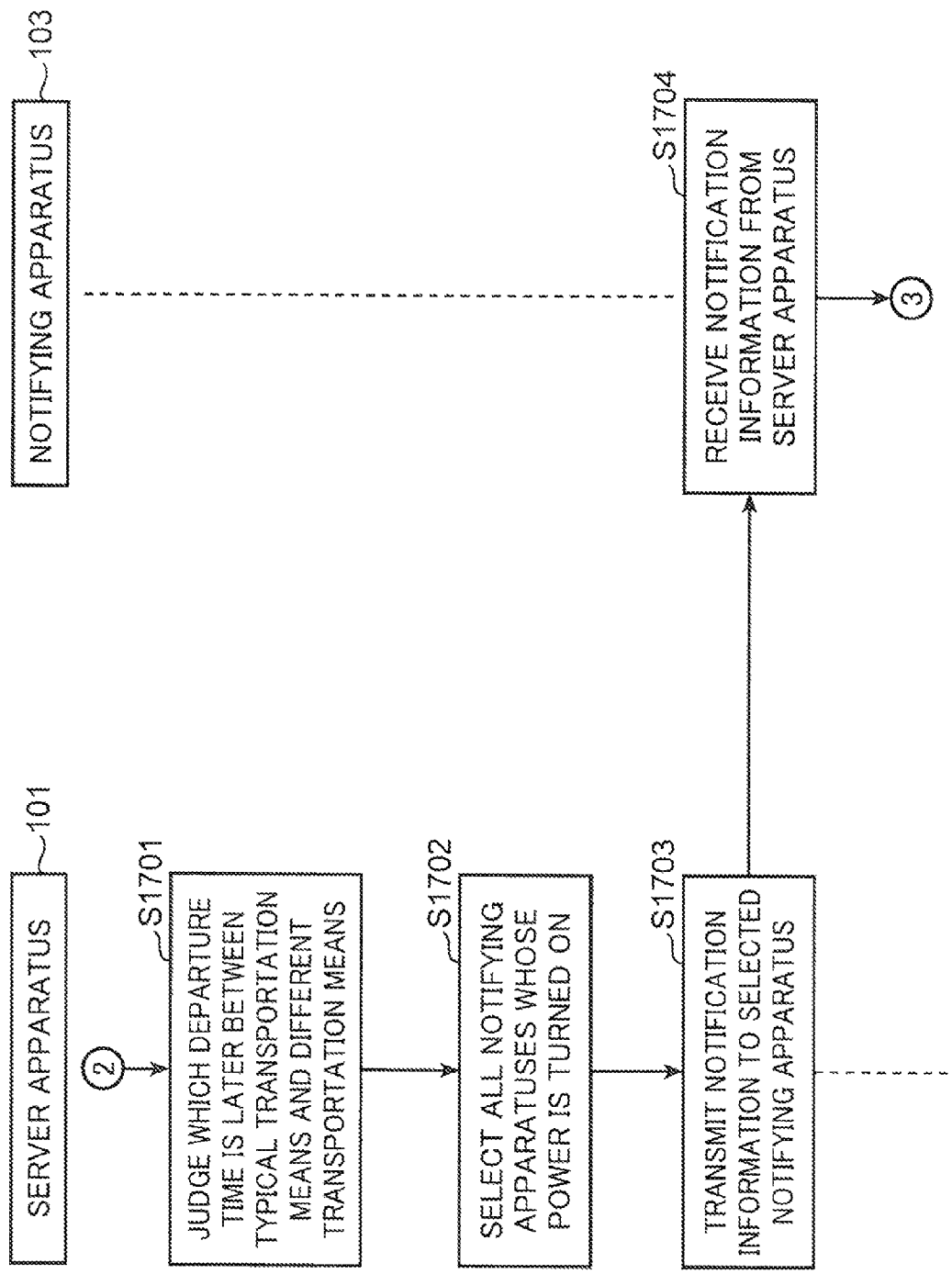
FIG. 17 is a flow chart of operations according to the second embodiment.
Figure 18:
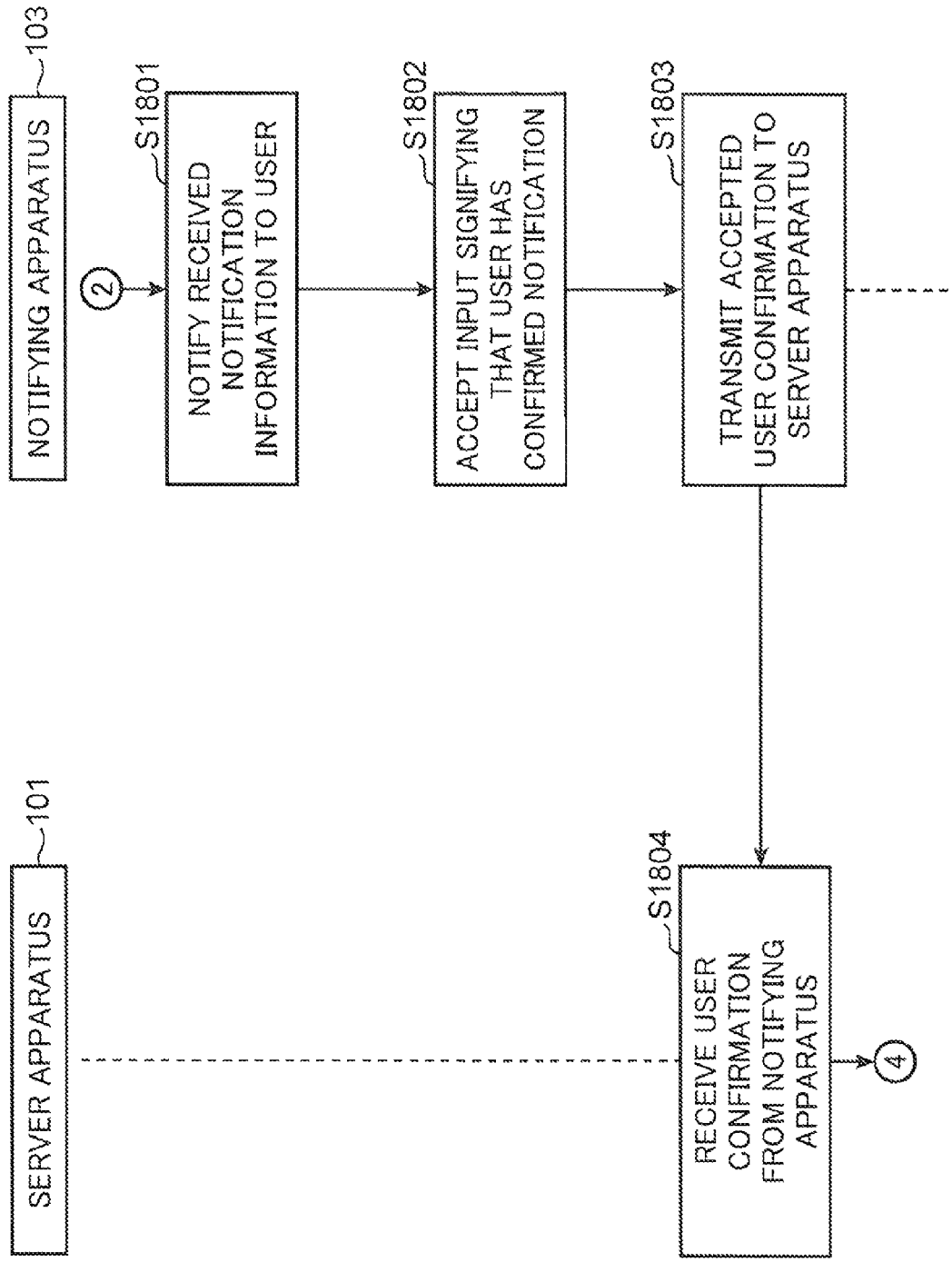
FIG. 18 is a flow chart of operations according to the second embodiment.
Figure 19:
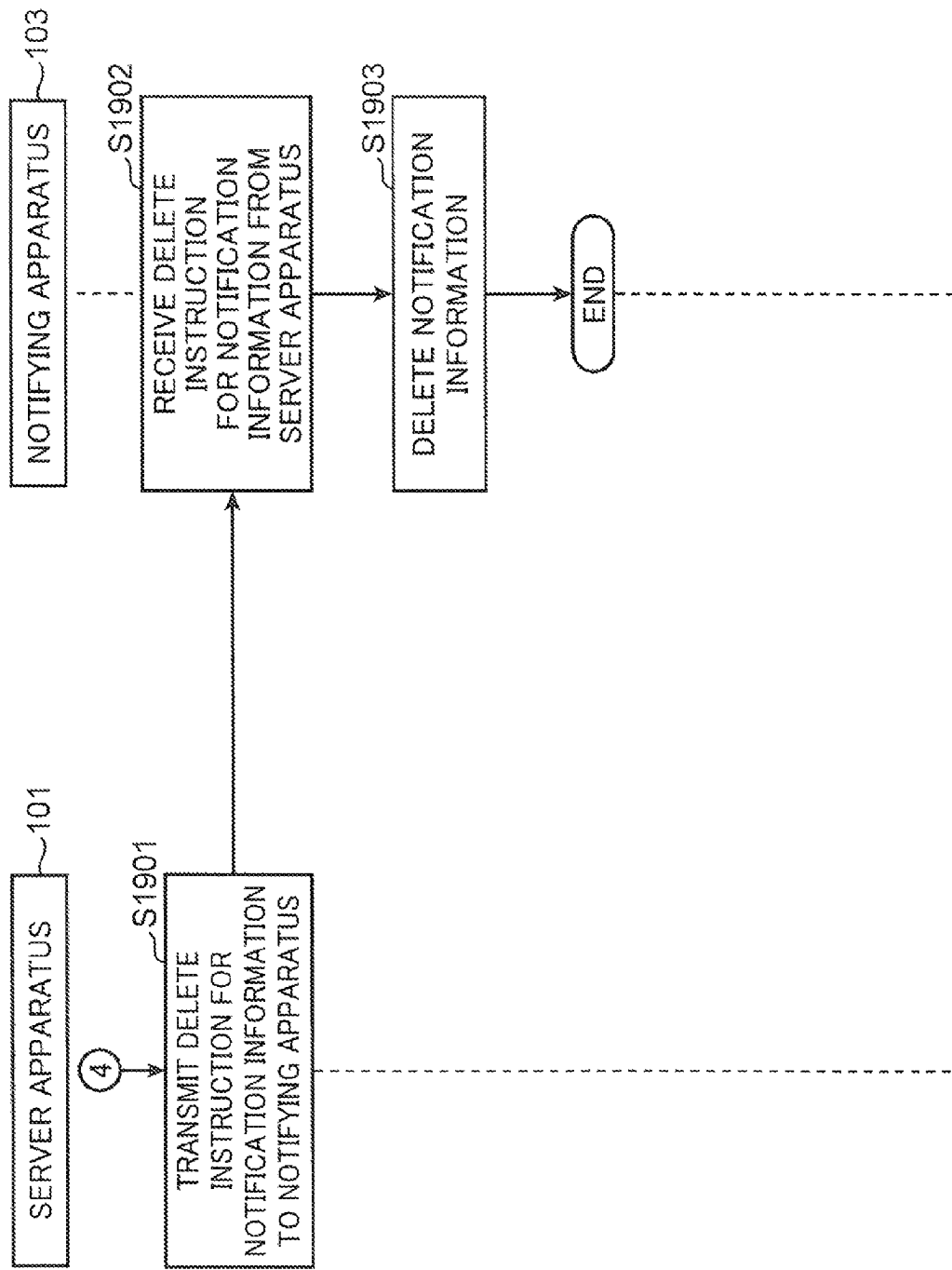
FIG. 19 is a flow chart of operations according to the second embodiment.

FIGS. 13 and 14 are diagrams showing an example of a notifying image based on notification information according to the second embodiment. In FIG. 13, a notifying image 704 based on notification information and a confirmation button 705 are displayed on a display 701 (corresponding to the output portion 302 shown in FIG. 6) of a television 700 (an example of the notifying apparatus 103).

In the example shown in FIG. 13, the notifying image 704 reading "One lane on Route XX is closed due to an accident. Travel by train is recommended. Departure time in case of train: 7:00, Departure time in case of car: 6:30" is displayed in the display region 703. Accordingly, the user is notified of the fact that trains are recommended instead of a car and a suggested departure time is 7:00 in case of trains and 6:30 in case of a car.

In FIG. 14, a notifying image 704 and a confirmation button 705 are displayed on a display 801 (corresponding to the output portion 302 shown in FIG. 6) of a smartphone 800 (an example of the notifying apparatus 103). In the example shown in FIG. 14, the notifying image 704 reading "The train operation schedule is disrupted today. Travel by car is recommended. Departure time in case of car: 7:00, Departure time in case of train: 6:30" is displayed in the display region 703. Accordingly, the user is notified of the fact that a car is recommended instead of trains and a suggested departure time is 7:00 in case of a car and 6:30 in case of trains.

2.2 Operations of Information Notification System

FIGS. 15 to 19 are flow charts showing examples of operations in a case where the server apparatus 101 transmits notification information including a departure time and the like to one or more notifying apparatuses 103 according to the second embodiment.

Based on an address of home, and a departure time, a destination and transportation means in accordance with a typical behavior pattern, which are managed by the behavior information manager 202, the communicating portion 201 of the server apparatus 101 acquires a required time from home to a destination on that day from the external system (step S1501, an example of the acquiring step).

The determining portion 203 determines a departure time that enables the user to be in time for the time the user should arrive at the destination on that day, based on the required time from home to from home to the destination on that day as acquired by the communicating portion 201 and on a departure time and an arrival time in accordance with a typical behavior pattern which is managed by the behavior information manager 202 (step S1502, an example of the determining step).

The judging portion 204 judges whether or not the departure time determined by the determining portion 203 is earlier than the departure time in the typical behavior pattern which is managed by the behavior information manager 202 (step S1601, an example of the judging step). When the judging portion 204 judges that the determined departure time is not earlier than the departure time in the typical behavior pattern (NO in step S1602), the controller 208 ends the process without performing any operation.

When the judging portion 204 judges that the determined departure time is earlier than the departure time in the typical behavior pattern (YES in step S1602), the communicating portion 201 further acquires, from an external system, a required time from home to the destination on that day when traveling on transportation means that differs from transportation means in accordance with the typical behavior pattern managed by the behavior information manager 202 (step S1603).

The judging portion 204 judges which departure time is later between a case where the transportation means in accordance with the typical behavior pattern is used and a case where a different transportation means is used (step S1701). The selector 207 selects all notifying apparatuses 103 whose power supply is currently on among the one or more notifying apparatuses 103 managed by the apparatus information manager 206 (step S1702, an example of the selecting step).

The notifying portion 205 transmits notification information including a departure time and transportation means to the notifying apparatus 103 via the communicating portion 201 (step S1703, an example of the notifying step). The communicating portion 301 of the notifying apparatus 103 receives notification information including a suggested departure time for that day and transportation means from the server apparatus 101 (step S1704). The output portion 302 notifies the notification information received by the communicating portion 301 to the user (step S1801, an example of the output step).

In step S1801, the display 701 (corresponding to the output portion 302 in FIG. 6) displays the notifying image 704 including a suggested departure time and recommended transportation means, in FIG. 13 for example. The example in FIG. 13 shows the suggested departure time when using trains to be 7:00. On the other hand, in the typical weekday behavior pattern shown in FIG. 4, the arrival time at the workplace is 8:15. Therefore, it is shown that today's required time acquired in step S1501 is 1 hour and 15 minutes.

In addition, in the typical weekday behavior pattern shown in FIG. 4, the departure time from home is 7:30. Therefore, in step S1601, it is judged that the determined departure time is earlier than the departure time in the typical behavior pattern. Accordingly, in step S1603, today's required time when using different transportation means (a car in FIG. 13) is acquired. The example in FIG. 13 shows the suggested departure time when using a car to be 6:30. On the other hand, in the typical weekday behavior pattern shown in FIG. 4, the arrival time at the workplace is 8:15. Therefore, it is shown that today's required time acquired in step S1603 is 1 hour and 45 minutes. As a result, in FIG. 13, travel by trains is recommended.

In addition, in step S1801, the display 801 (corresponding to the output portion 302 in FIG. 6) displays the notifying image 704 including a suggested departure time and recommended transportation means, in FIG. 14 for example. In contrast to the example shown in FIG. 13, the example shown in FIG. 14 shows that the suggested departure time when using the trains is 6:30 and the suggested departure time when using a car is 7:00. As a result, in FIG. 14, travel by a car is recommended.

The input accepting portion 303 accepts an input by the user indicating that the user has confirmed the notification information output to the output portion 302 (step S1802, an example of the input accepting step). In step S1802, in the example shown in FIG. 14, the input accepting portion 303 senses that the confirmation button 705 has been tapped by the user.

The communicating portion 301 transmits an input by the user accepted by the input accepting portion 303 or, in other words, a user confirmation indicating that the user has confirmed the notification information to the server apparatus 101 (step S1803).

The communicating portion 201 of the server apparatus 101 receives a user confirmation indicating that the user has confirmed the notification information from the notifying apparatus 103 (step S1804). The communicating portion 201 transmits, to the notifying apparatus 103 having transmitted the notification information, a delete instruction to delete the notification information from the output portion 302 of the notifying apparatus 103 (step S1901).

The communicating portion 301 of the notifying apparatus 103 receives the delete instruction instructing to delete the notification information from the server apparatus 101 (step S1902). According to the delete instruction of notification information received via the communicating portion 301, the output portion 302 deletes the notification information being output (step S1903, an example of the deleting step).

As described above, according to the present second embodiment, the communicating portion 201 of the server apparatus 101 acquires today's required time from home to a destination when using transportation means that differs from transportation means in accordance with a typical behavior pattern of a user from an external system. The judging portion 204 judges which departure time is earlier between a case where the transportation means in accordance with the typical behavior pattern of the user is used and a case where different transportation means is used. Using the judgment result, the notifying portion 205 transmits notification information including a suggested departure time and recommended transportation means to the notifying apparatus 103 selected by the selector 207.

Accordingly, a suggested departure time and recommended transportation means can be presented to the user who has woken up as notification information by the notifying apparatus 103, in accordance with operation information of public transportation means or vehicular traffic congestion information. In addition, a notifying apparatus 103 whose power supply is on has been selected by the selector 207. Therefore, notification information can be presented to the user in a more appropriate manner.

Third Embodiment 3.1 Configuration of Information Notification System

Figure 20:
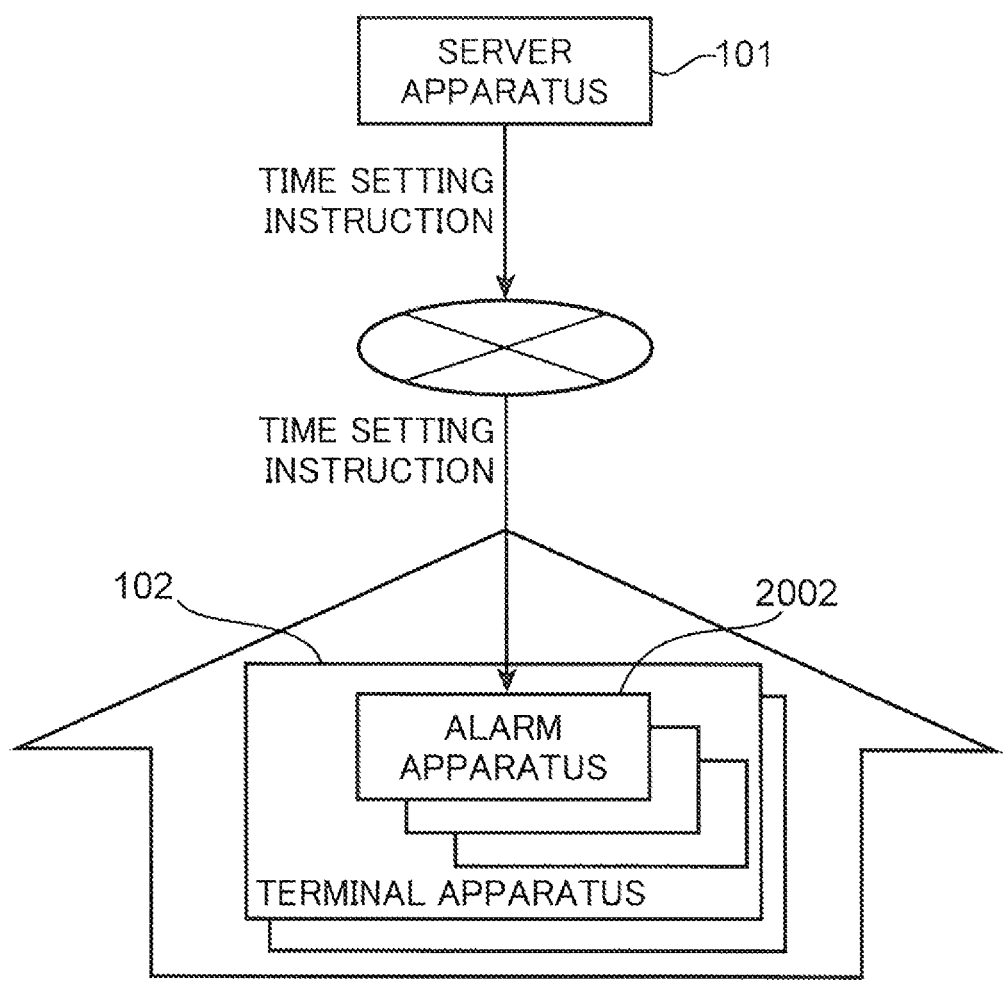
FIG. 20 is a configuration diagram of an information notification system according to a third embodiment.

FIG. 20 is a diagram showing an example of a configuration of an information notification system according to a third embodiment. As shown in FIG. 20, the information notification system according to the third embodiment includes a server apparatus 101 and one or more terminal apparatuses 102. The one or more terminal apparatuses 102 include one or more alarm apparatuses 2002.

The server apparatus 101 accumulates and manages a use history of the terminal apparatuses 102 inside the house, a behavior history of the user that is uploaded by a sensor (not shown) installed inside the house, and the like. The server apparatus 101 acquires today's required time that corresponds to a behavior pattern of the user from an external system possessing operation information of public transportation means or vehicular traffic congestion information. Based on today's required time which has been acquired and the behavior pattern of the user, the server apparatus 101 transmits an instruction to set time of the alarm to the alarm apparatus 2002.

The alarm apparatus 2002 receives the instruction to set time of the alarm from the server apparatus 101 and updates the time of the alarm in accordance with contents of the received instruction.

3.2 Configuration of Server Apparatus 101

A configuration of the server apparatus 101 according to the third embodiment is similar to that of the first embodiment shown in FIG. 2. The third embodiment will be described while focusing on functions that differ from the first embodiment.

The behavior information manager 202 manages behavior information related to the behavior of the user. For example, the behavior information manager 202 accumulates and manages a use history of the terminal apparatuses 102 inside the house and a behavior history of the user that is uploaded by a sensor (not shown) installed inside the house. Furthermore, the behavior information manager 202 acquires GPS information of a terminal apparatus 102 that is carried by the user such as a smartphone, a tablet apparatus, or a smart watch in order to accumulate and manage a behavior history of the user outside of the house. The behavior information manager 202 generates a behavior pattern of the user from the behavior history that is accumulated on a daily basis. Behavior information of the user which is managed by the behavior information manager 202 will now be described with reference to FIGS. 21 and 22.

FIG. 21 is a diagram showing an example of a behavior history 2300 of the user which is managed by the behavior information manager 202. The behavior information manager 202 accumulates and manages time information related to everyday movement and the like as the behavior history 2300 (an example of behavior information). As shown in FIG. 21, the behavior history 2300 includes a user ID, an address, a date, a wakeup time, a departure time, a return time, an arrival point (destination), an arrival time, and transportation means. In the behavior history 2300 according to the third embodiment, a "wakeup time" has been added to the behavior history 500 according to the first embodiment (FIG. 3). A "wakeup time" represents the time at which the user had gotten up.

The example in FIG. 21 shows that a user with a user ID of "98765" had woken up at "6:35" on "Apr. 4, 2013", left home at "7:30", returned home at "21:00", arrived at a workplace (destination) at "3-2-1 Y Town, X City" at "8:13", and a "train" had been used as the transportation means to arrive at the workplace.

FIG. 22 is a diagram showing an example of a behavior pattern 2200 of the user which is managed by the behavior information manager 202. The behavior information manager 202 generates a behavior pattern 2200 (an example of behavior information) of the user from the behavior history 2300 of the user. As shown in FIG. 22, the behavior pattern 2200 includes a user ID, a typical weekday behavior pattern, and a typical weekend behavior pattern. In the behavior pattern 2200 according to the third embodiment, a "time required from waking up to departure" is respectively added to typical behavior patterns on weekdays and on weekends in the behavior pattern 400 (FIG. 4) according to the first embodiment.

In the example shown in FIG. 22, on a weekday, a user with a user ID of "98765" travels to a destination "3-2-1 Y Town, X City" on train and the time required from waking up to departure is "40 minutes". FIG. 22 shows that a typical weekday behavior pattern is a behavior pattern including "getting up at 6:30, leaving home at 7:30, and arriving at the workplace at 8:15" and "leaving the workplace at 20:00, arriving at home at 20:30, and going to bed at 23:00".

In addition, on the weekend, the same user travels to a destination "2-2-2 E Town, D City" by car and the time required from waking up to departure is "30 minutes". FIG. 22 shows that a typical weekend behavior pattern is a behavior pattern including "getting up at 9:00, leaving home at 10:00, and arriving at a gym at 10:30" and "leaving the gym at 13:30, arriving at home at 14:00, and going to bed at 23:00".

In a similar manner to the first embodiment, based on an address of home, and a departure time, a destination and transportation means in accordance with a typical behavior pattern, which are managed by the behavior information manager 202, the communicating portion 201 acquires a required time from home to a destination on that day from the external system.

For example, in the example of the behavior pattern 2200 shown in FIG. 22, when that day is a weekday, the communicating portion 201 uses traveling by train from a home address "5-4-3 B Town, A City" to a destination "3-2-1 Y Town, X City" and an arrival at "8:15" as guides and acquires a behavior pattern in accordance with the operation conditions on that day from the external system. In addition, when traveling by car, the communicating portion 201 acquires a required time in accordance with today's vehicular traffic congestion information from the external system.

The judging portion 204 judges whether or not the departure time on that day as determined by the determining portion 203 is earlier than the wakeup time in the typical behavior pattern which is managed by the behavior information manager 202.

When the judging portion 204 judges that the determined departure time is earlier than the wakeup time in the typical behavior pattern, the communicating portion 201 transmits an instruction for advancing the time setting of the alarm to the alarm apparatus 2002.

At this point, using the apparatus information 600 (FIG. 5) managed by the apparatus information manager 206, the selector 207 of the server apparatus 101 selects a terminal apparatus with an output portion that includes an alarm function among the terminal apparatuses 102 as the alarm apparatus 2002. In the example shown in FIG. 5, the selector 207 selects a smartphone with an output portion having an alarm function due to a vibration function as the alarm apparatus 2002.

3.3 Configuration of Alarm Apparatus 2002

Figure 23:
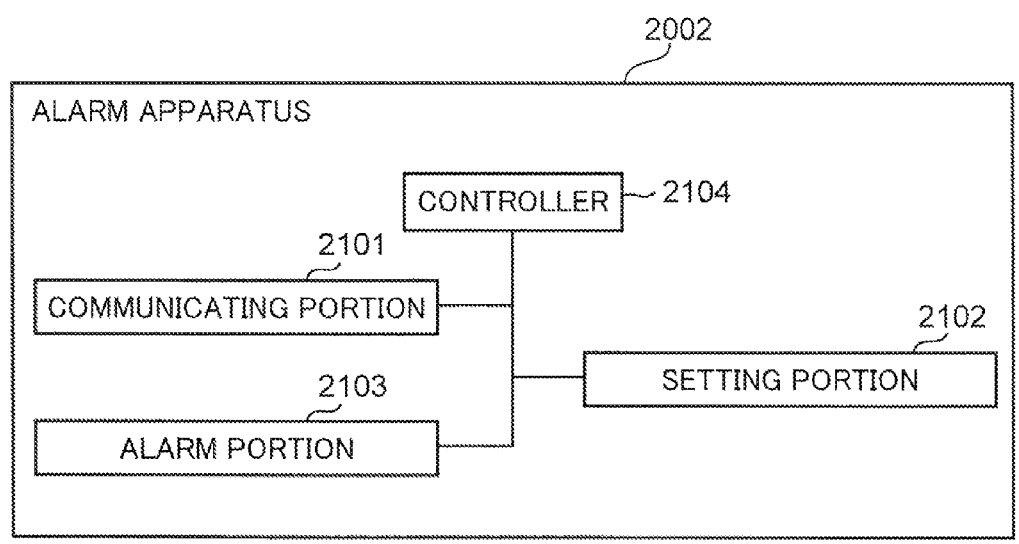
FIG. 23 is a configuration diagram of a terminal apparatus according to the third embodiment.

FIG. 23 is a block diagram showing an example of a configuration of the alarm apparatus 2002 shown in FIG. 20. A detailed configuration of the alarm apparatus 2002 will now be described with reference to FIG. 23.

As shown in FIG. 23, the alarm apparatus 2002 includes a communicating portion 2101, a setting portion 2102, an alarm portion 2103, and a controller 2104.

The alarm apparatus 2002 is constituted by a microprocessor, a RAM, a ROM, a hard disk, and the like which are not specifically illustrated. A computer program is stored in the RAM, the ROM, and the hard disk. The alarm apparatus 2002 performs the respective functions shown in FIG. 23 as the microprocessor operates in accordance with the program.

Moreover, the respective functional blocks of the alarm apparatus 2002 including the communicating portion 2101, the setting portion 2102, the alarm portion 2103, and the controller 2104 are typically realized by an LSI that is an integrated circuit. The respective functional blocks may be individually configured as single chips. Alternatively, the respective functional blocks may be configured as single chips so as to include one or more functional blocks or to include a part of the respective functional blocks.

While an LSI has been cited herein, other terms such as an IC, a system LSI, a super LSI, or an ultra LSI may be used depending on degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may also be used.

Moreover, if techniques for realizing circuit integration to replace LSIs should emerge due to progress made in semiconductor technology or due to derivative technology, it is obvious that the functional blocks may be integrated using such techniques. One potential candidate of such a technique is the application of bio-technology.

Finally, each functional block may be realized by software or by a combination of an LSI and software. In addition, the software may be tamper resistant.

The communicating portion 2101 receives an instruction for advancing a time setting of the alarm from the server apparatus 101. The setting portion 2102 updates a set time of the alarm portion 2103 in accordance with contents of the time setting instruction of the alarm received by the communicating portion 2101. The alarm portion 2103 emits an alarm to the user using, for example, a vibration function. The controller 2104 realizes functions of the alarm apparatus 2002 by managing and controlling the communicating portion 2101, the setting portion 2102, and the alarm portion 2103.

3.4 Operations of Information Notification System

Figure 24:
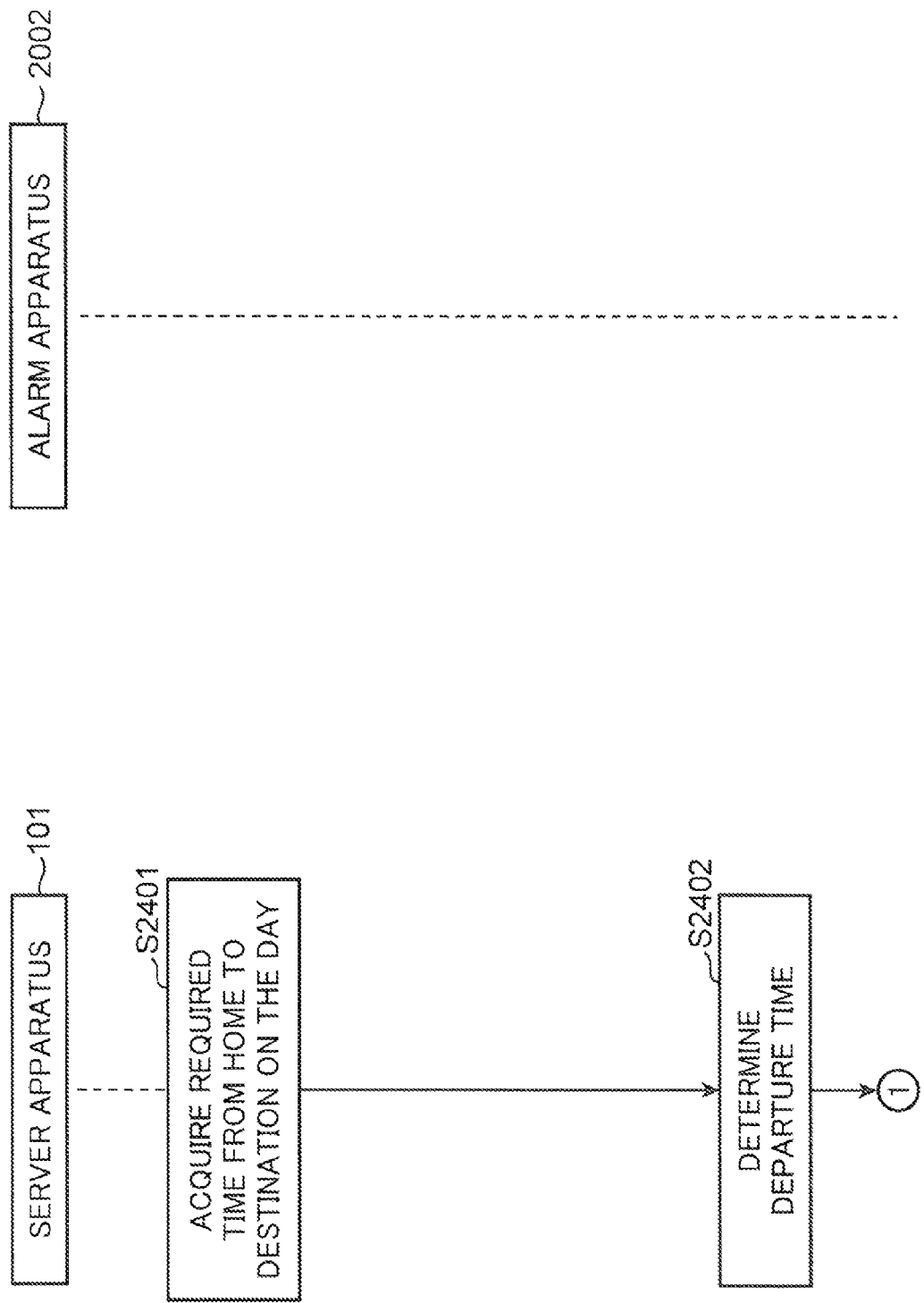
FIG. 24 is a flow chart of operations according to the third embodiment.
Figure 25:
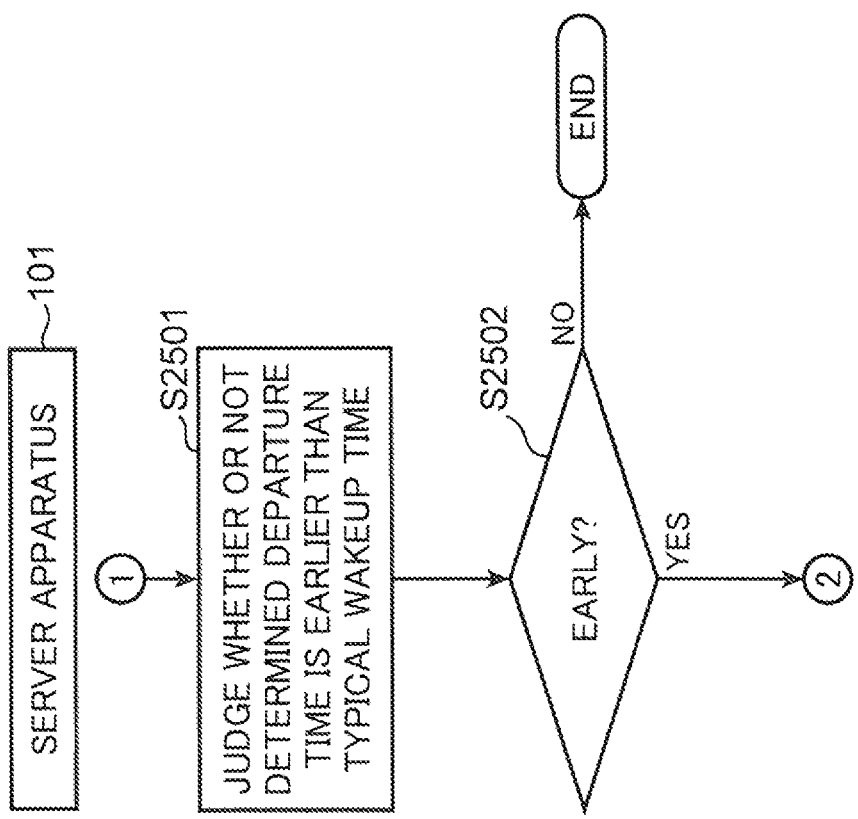
FIG. 25 is a flow chart of operations according to the third embodiment.
Figure 26:
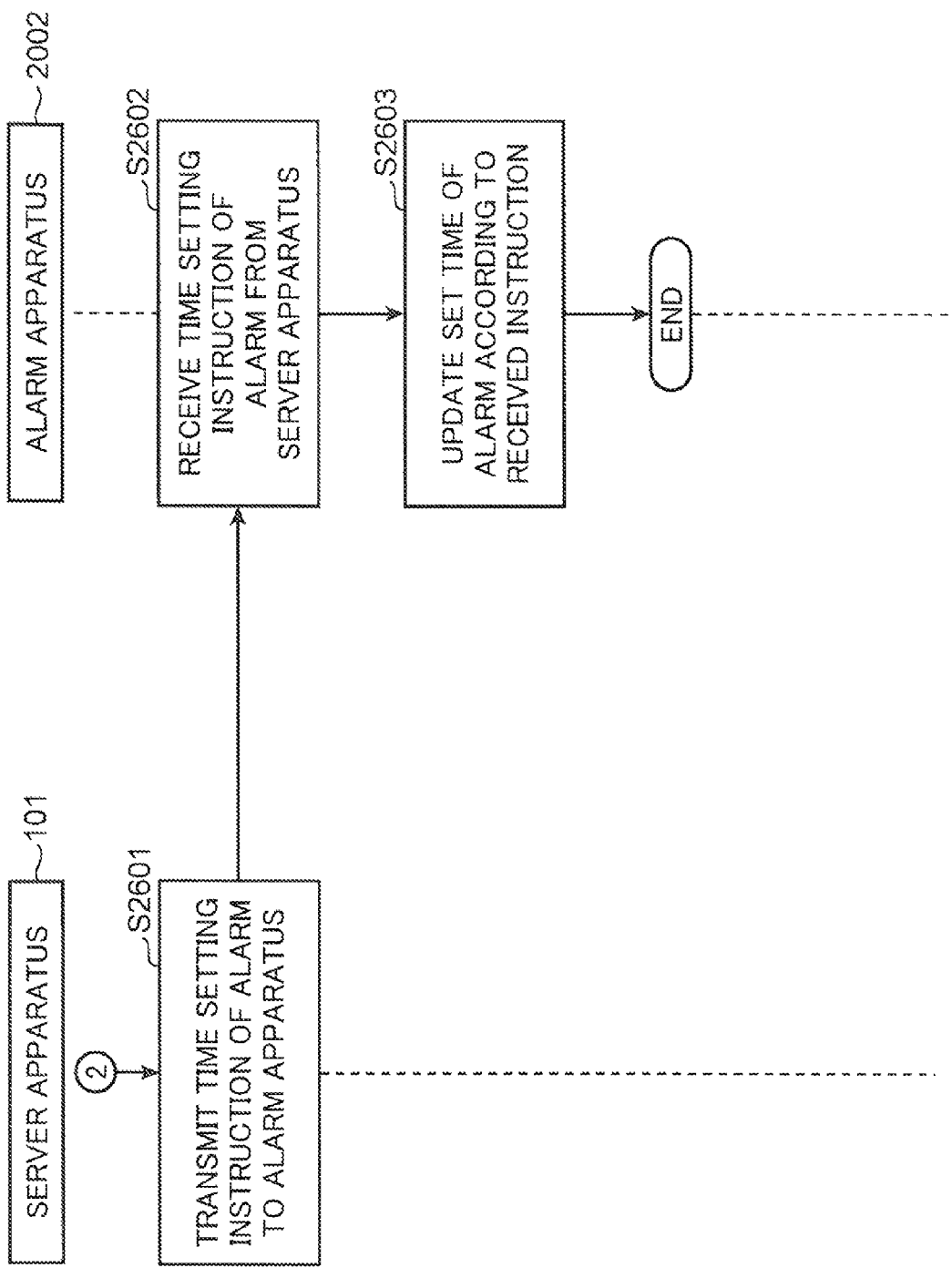
FIG. 26 is a flow chart of operations according to the third embodiment.

FIGS. 24 to 26 are flow charts showing examples of operations in a case where the server apparatus 101 transmits a time setting instruction of the alarm to one or more alarm apparatuses 2002 according to the third embodiment.

Based on an address of home, and a departure time, a destination and transportation means in accordance with a typical behavior pattern, which are managed by the behavior information manager 202, the communicating portion 201 of the server apparatus 101 acquires a required time from home to a destination on that day from the external system (step S2401, an example of the acquiring step).

The determining portion 203 determines a departure time that enables the user to be in time for the time the user should arrive at the destination on that day, based on the required time from home to the destination on that day as acquired by the communicating portion 201 and on a departure time and an arrival time in accordance with a typical behavior pattern which is managed by the behavior information manager 202 (step S2402, an example of the determining step).

The judging portion 204 judges whether or not the departure time determined by the determining portion 203 is earlier than the wakeup time in the typical behavior pattern which is managed by the behavior information manager 202 (step S2501, an example of the judging step). When the judging portion 204 judges that the determined departure time is not earlier than the wakeup time in the typical behavior pattern (NO in step S2502), the controller 208 ends the process without performing any operation.

When the judging portion 204 judges that the determined departure time is earlier than the wakeup time in the typical behavior pattern (YES in step S2502), the communicating portion 201 transmits an instruction to advance a time setting of an alarm to the alarm apparatus 2002 as notification information (step S2601, an example of the notifying step).

The communicating portion 2101 of the alarm apparatus 2002 receives an instruction for advancing a time setting of the alarm from the server apparatus 101 (step S2602). The setting portion 2102 updates a set time of the alarm portion 2103 in accordance with contents of the time setting instruction of the alarm received by the communicating portion 2101 (step S2603, an example of the output step).

As described above, according to the present third embodiment, the judging portion 204 judges whether or not a determined departure time is earlier than a wakeup time in the typical behavior pattern of the user. When it is judged that the determined departure time is earlier than the wakeup time, the communicating portion 201 transmits an instruction to advance a time setting of an alarm to the alarm apparatus 2002. The setting portion 2102 of the alarm apparatus 2002 updates a set time of the alarm portion 2103 in accordance with contents of the instruction.

Accordingly, whether or not the wakeup time is to be advanced is judged in accordance with a typical behavior pattern of the user, and when the wakeup time needs to be advanced, the wakeup time of the user can be advanced by the alarm apparatus 2002 whose set time has been updated.

Moreover, in the instruction for advancing the time setting of an alarm according to the third embodiment described above, a time width by which the time setting is advanced may be set to a value that enables sufficient time for preparing for departure to be secured.

Fourth Embodiment 4.1 Configurations of Information Notification System, Server Apparatus 101, and Alarm Apparatus 2002.

A configuration of the information notification system according to a fourth embodiment is similar to that of the third embodiment shown in FIG. 20. A configuration of the server apparatus 101 according to the fourth embodiment is similar to that of the first embodiment shown in FIG. 2. A configuration of the alarm apparatus 2002 according to the fourth embodiment is similar to that of the third embodiment shown in FIG. 23. The fourth embodiment will now be described while focusing on functions that differ from the first and third embodiments.

The judging portion 204 of the server apparatus 101 judges whether or not the time necessary from waking up to departure in accordance with a typical behavior pattern which is managed by the behavior information manager 202 is longer than a difference between a departure time on that day as determined by the determining portion 203 and a wakeup time in accordance with the typical behavior pattern managed by the behavior information manager 202.

When the judging portion 204 judges that the time necessary from waking up to departure is longer than the difference, the communicating portion 201 of the server apparatus 101 transmits an instruction to advance a time setting of an alarm to the alarm apparatus 2002.

4.2 Operations of Information Notification System

Figure 27:
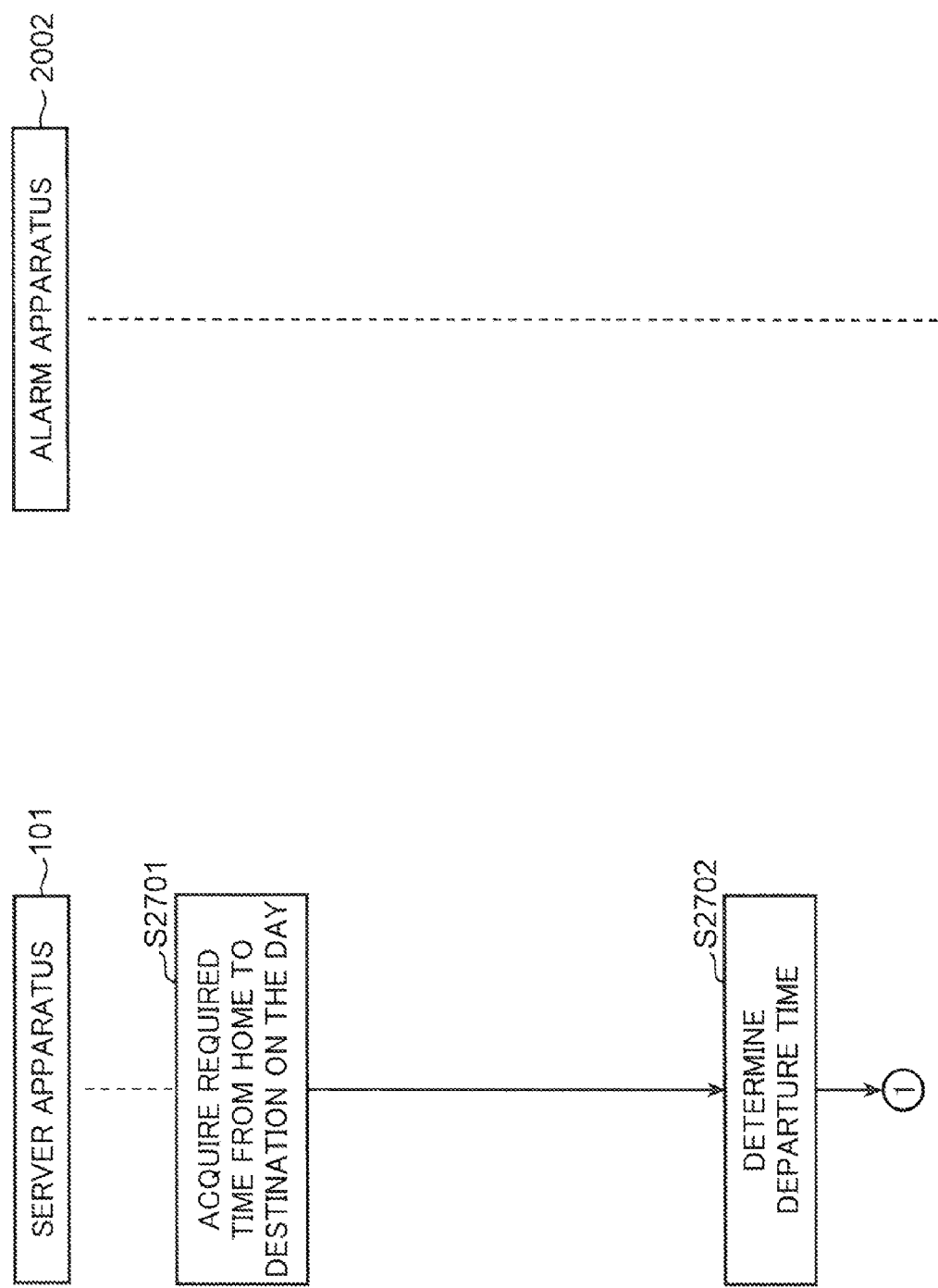
FIG. 27 is a flow chart of operations according to a fourth embodiment.
Figure 28:
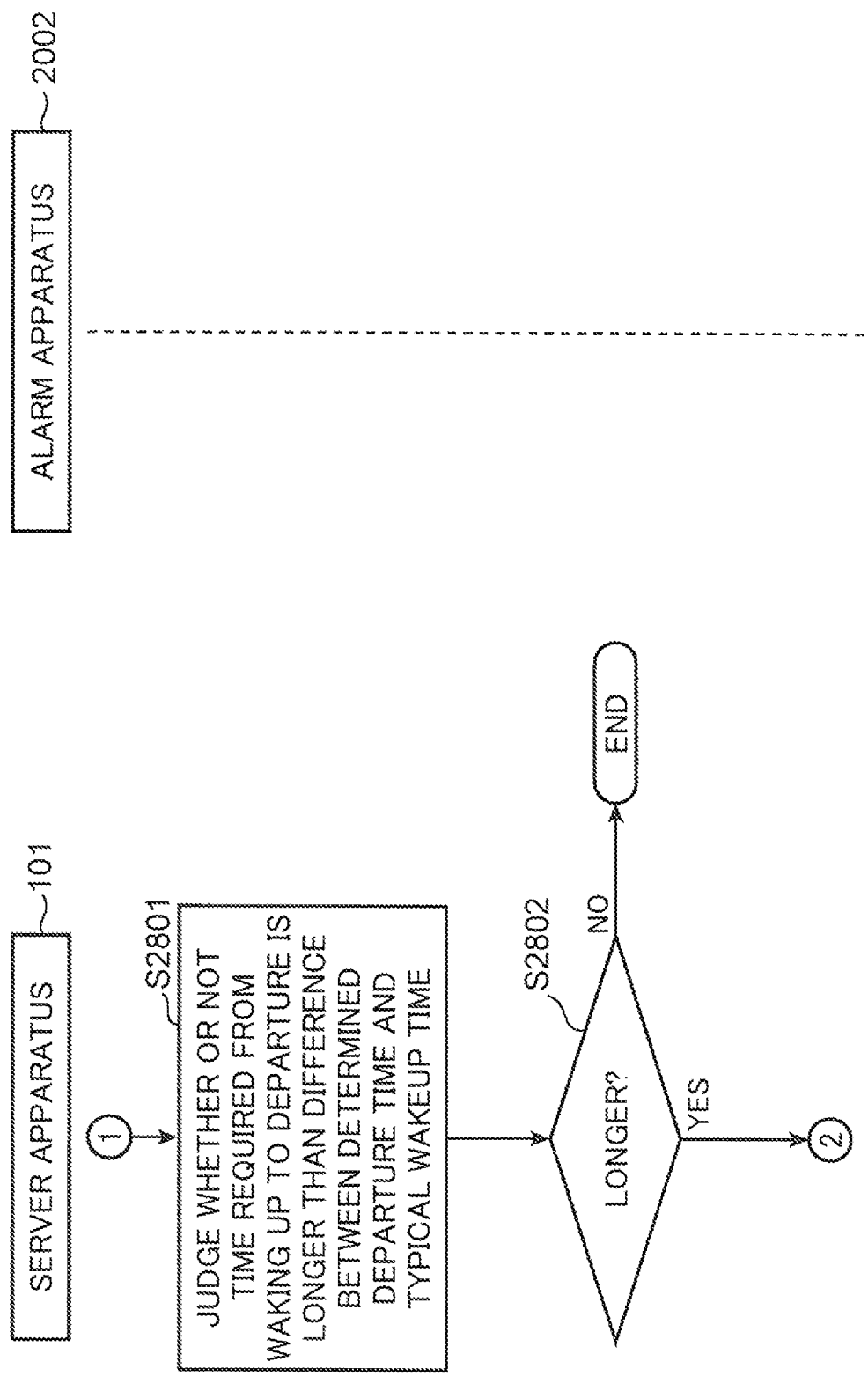
FIG. 28 is a flow chart of operations according to the fourth embodiment.
Figure 29:
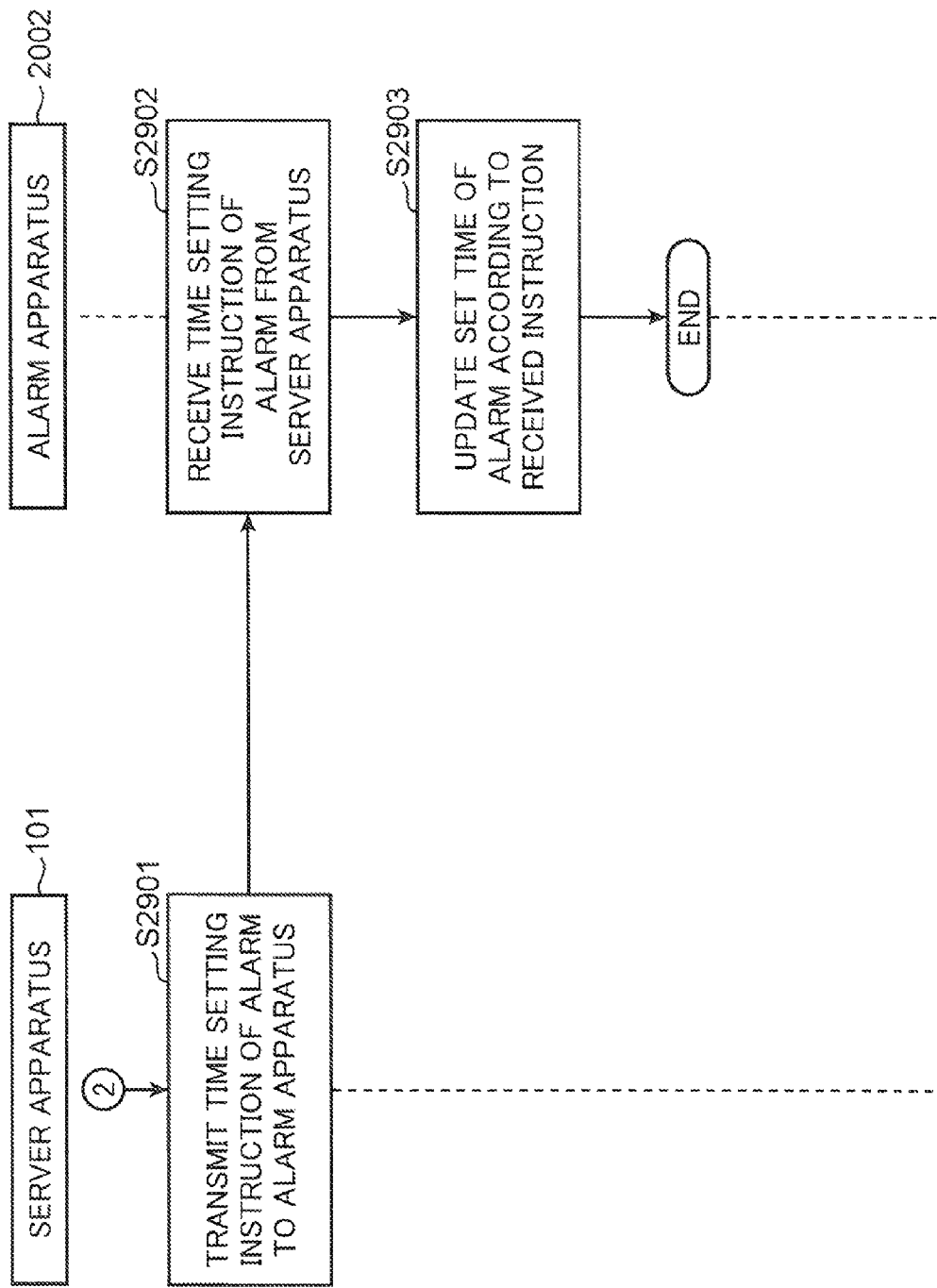
FIG. 29 is a flow chart of operations according to the fourth embodiment.

FIGS. 27 to 29 are flow charts showing examples of operations in a case where the server apparatus 101 transmits a time setting instruction of the alarm to one or more alarm apparatuses 2002 according to the fourth embodiment.

Based on an address of home, and a departure time, a destination and transportation means in accordance with a typical behavior pattern, which are managed by the behavior information manager 202, the communicating portion 201 of the server apparatus 101 acquires a required time from home to a destination on that day from the external system (step S2701, an example of the acquiring step).

The determining portion 203 determines a departure time that enables the user to be in time for the time the user should arrive at the destination on that day, based on the required time from home to the destination on that day as acquired by the communicating portion 201 and on a departure time and an arrival time in accordance with a typical behavior pattern which is managed by the behavior information manager 202 (step S2702, an example of the determining step).

The judging portion 204 judges whether or not the time necessary from waking up to departure in accordance with a typical behavior pattern which is managed by the behavior information manager 202 is longer than a difference between a departure time on that day as determined by the determining portion 203 and a wakeup time in accordance with the typical behavior pattern which is managed by the behavior information manager 202 (step S2801, an example of the judging step). When the judging portion 204 judges that the time necessary from waking up to departure is not longer than the difference (NO in step S2802), the controller 208 ends the process without performing any operation.

When the judging portion 204 judges that the time necessary from waking up to departure is longer than the difference (YES in step S2802), the communicating portion 201 transmits an instruction to advance a time setting of an alarm to the alarm apparatus 2002 (step S2901, an example of the notifying step).

The communicating portion 2101 of the alarm apparatus 2002 receives an instruction for advancing a time setting of an alarm from the server apparatus 101 (step S2902). The setting portion 2102 updates a set time of the alarm portion 2103 in accordance with contents of the time setting instruction of the alarm received by the communicating portion 2101 (step S2903, an example of the output step).

As described above, according to the present fourth embodiment, the judging portion 204 judges whether or not the time necessary from waking up to departure in accordance with a typical behavior pattern of the user is longer than a difference between a determined departure time and a wakeup time in the typical behavior pattern of the user. When it is judged that the time necessary from waking up to departure is longer than the difference, the communicating portion 201 transmits an instruction to advance a time setting of an alarm to the alarm apparatus 2002. The setting portion 2102 of the alarm apparatus 2002 updates a set time of the alarm portion 2103 in accordance with contents of the time setting instruction of the alarm.

Accordingly, whether or not the wakeup time is to be advanced is judged in accordance with a typical behavior pattern of the user, and when the wakeup time needs to be advanced, the wakeup time of the user can be advanced by the alarm apparatus 2002 whose set time has been updated.

Moreover, in the instruction for advancing the time setting of an alarm according to the fourth embodiment described above, a time width by which the time setting is advanced may be set to a value that enables sufficient time from waking up to departure to be secured. For example, the judging portion 204 judges that the time necessary from waking up to departure is 15 minutes longer than a difference between a determined departure time and a wakeup time in a typical behavior pattern of the user. In this case, the communicating portion 201 of the server apparatus 101 may transmit an instruction to advance a time setting of an alarm by 15 minutes to the alarm apparatus 2002.

Modifications (1) In the first and second embodiments described above, the selector 207 uses the apparatus information 600 to select all terminal apparatuses 102 which include an output portion (in other words, the terminal apparatuses 102 correspond to notifying apparatuses) and whose power supply is currently on. However, the present disclosure is not limited thereto. The present disclosure may adopt, for example, the respective aspects described below.

FIG. 30 is a diagram showing an example of the apparatus information 600 managed by the apparatus information manager 206 which differs from that shown in FIG. 5. The apparatus information 600 shown in FIG. 30 includes a presence or absence of an operation (an example of operation information) in addition to a type, a terminal apparatus ID, a presence or absence of an output portion, and a power status. A "presence or absence of an operation" indicates whether or not the user is currently operating the terminal apparatus 102. The apparatus information manager 206 may update the "presence or absence of an operation" in the apparatus information 600 shown in FIG. 30 by judging whether or not an operation has been performed on the terminal apparatus 102 using log information of the terminal apparatus 102 or the like.

The selector 207 may be configured so as to select a notifying apparatus 103 whose power supply is on and which is being operated by the user. In the example shown in FIG. 30, an intercom is being operated by the user. As shown in FIG. 30, since the intercom includes an output portion, the intercom corresponds to a notifying apparatus 103. Therefore, the selector 207 selects the intercom. Although different from the example shown in FIG. 30, when a smartphone is being operated by the user for example, the selector 207 may select the smartphone.

FIG. 31 is a diagram of an example of the apparatus information 600 managed by the apparatus information manager 206 which differs from those shown in FIGS. 5 and 30. The apparatus information 600 shown in FIG. 31 includes a location (an example of location information) in addition to a type, a terminal apparatus ID, a presence or absence of an output portion, and a power status. A "location" indicates a room in which the terminal apparatus 102 is arranged. The apparatus information manager 206 may manage the apparatus information 600 shown in FIG. 31. The "location" in the apparatus information 600 shown in FIG. 31 may be initially registered by the user.

The selector 207 may extrapolate a room in which the user is currently present and select a notifying apparatus 103 which is arranged in the room and whose power supply is on. In the example shown in FIG. 31, power supply of a television and an air conditioner 1 that are arranged in a living room is on. Therefore, the selector 207 extrapolates that the user is present in the living room and selects the television that is arranged in the living room.

Although different from the example shown in FIG. 31, when power supply of a microwave oven is on for example, the selector 207 may extrapolate that the user is present in a kitchen. As shown in FIG. 31, since the microwave oven includes an output portion, the microwave oven corresponds to a notifying apparatus 103. Therefore, the selector 207 may be configured so as to select the microwave oven. In addition, the selector 207 may be configured so as to select a smartphone, when it is extrapolated that the user is outside based on GPS information of the smartphone for example.

FIG. 32 is a diagram of an example of the apparatus information 600 managed by the apparatus information manager 206 which differs from those shown in FIGS. 5, 30, and 31. The apparatus information 600 shown in FIG. 32 includes a location and a presence or absence of an operation in addition to a type, a terminal apparatus ID, a presence or absence of an output portion, and a power status. In other words, the apparatus information shown in FIG. 32 is equivalent to a combination of FIGS. 30 and 31. The apparatus information manager 206 may update the "presence or absence of an operation" in the apparatus information 600 shown in FIG. 32 by judging whether or not an operation has been performed on the terminal apparatus 102 using log information of the terminal apparatus 102 or the like.

The selector 207 may extrapolate a room in which the user is currently present using the "presence or absence of an operation" and select a notifying apparatus 103 that is arranged in the room. In the example shown in FIG. 32, an operation such as opening and closing a door of a refrigerator is performed. Therefore, the selector 207 may extrapolate that the user is present in the kitchen and selects the microwave oven that is arranged in the living room. In addition, in the example shown in FIG. 32, the power supply of the microwave oven is off. Therefore, the selector 207 may turn on the power of the microwave oven via the communicating portion 201 so that an output portion of the microwave oven becomes operable.

Further alternatively, the apparatus information manager 206 may manage a state of whether or not the user is currently near the notifying apparatus 103 which can be obtained from a sensor or the like that is arranged inside the house or included in the terminal apparatus 102 itself. In addition, the selector 207 may be configured so as to select a notifying apparatus 103 to which the user is near.

Even with the aspects described above, in a similar manner to the first and second embodiments described above, notification information can be notified to the user and a similar effect to the first and second embodiments described above can be obtained.

(2) In the first and second embodiments and FIGS. 30 and 31 described above, the selector 207 selects a notifying apparatus 103 whose power supply is on. However, the present disclosure is not limited thereto. In a similar manner to the case shown in FIG. 32, the selector 207 may be configured so as to turn on power of the notifying apparatus 103 via the communicating portion 201 so that the output portion 302 of the notifying apparatus 103 becomes operable. In this case, the selector 207 need no longer select a notifying apparatus 103 whose power supply is on.

(3) In the first to fourth embodiments described above, the server apparatus 101 acquires a required time from home to a destination from an external system. However, the present disclosure is not limited thereto. For example, the server apparatus 101 may be configured so as to store traffic information such as operation information of public transportation means and vehicular traffic congestion information. The server apparatus 101 may be configured so as to calculate the required time from the stored traffic information. Alternatively, the server apparatus 101 may be configured so as to acquire traffic information such as operation information of public transportation means and vehicular traffic congestion information from an external server. The server apparatus 101 may be configured so as to calculate the required time from the acquired traffic information. Alternatively, the server apparatus 101 may be configured so as to additionally acquire weather information, local event information, and the like and to calculate the required time by taking such information into consideration.

(4) In the first to fourth embodiments described above, the behavior information manager 202 extrapolates the typical behavior pattern, the destination, or the transportation means used to travel to the destination from the behavior history 500 (first and second embodiments) or the behavior history 2300 (third and fourth embodiments) obtained from a daily use history of the terminal apparatus 102, information uploaded from a sensor installed inside the house, GPS information of the terminal apparatus 102 such as a smartphone, a tablet apparatus, a smart watch which is carried by a user or a car navigation system, information from a sensor installed outside of the house (for example, information from an automated ticket gate for trains) or the like, and automatically generates the behavior pattern 400 (first and second embodiments) or the behavior pattern 2200 (third and fourth embodiments).

However, the present disclosure is not limited thereto. For example, a configuration may be adopted in which all of or a part of a typical behavior pattern, a destination, or transportation means used to travel to the destination is set in advance and registered to the behavior information manager 202 by the user. When all information is to be set and registered to the behavior information manager 202 by the user, the behavior information manager 202 need not accumulate the behavior history 500 or 2300.

(5) In the third and fourth embodiments described above, the communicating portion 201 of the server apparatus 101 transmits an instruction to advance a time setting of an alarm to the alarm apparatus 2002. In this case, the communicating portion 201 may be configured in a similar manner to transmit an instruction to advance a timer reservation setting of another terminal apparatus 102 on which a timer reservation has been made. The apparatus information manager 206 may be configured so as to manage a state of the timer reservation of the terminal apparatus 102. The communicating portion 201 may be configured so as to transmit an instruction to advance a timer reservation setting to a terminal apparatus 102 on which a timer reservation has been made using a state of the timer reservation of the terminal apparatus 102 which is managed by the apparatus information manager 206.

For example, a configuration may be adopted in which, when a timer reservation is performed so that an operation of a washing machine (an example of the terminal apparatus 102 as shown in FIG. 5) is completed or a rice cooker (an example of the terminal apparatus 102 as shown in FIG. 5) finishes cooking rice at the same time as a set time of the alarm portion 2103 of the alarm apparatus 2002, the communicating portion 201 transmits an instruction to move up the timer reservation time of the washing machine or the rice cooker.

(6) The first to fourth embodiments described above may be configured such that a gateway (for example, a gateway 13 shown in FIG. 33A) that manages a terminal apparatus 102 inside the house exists inside the house and that the gateway includes a part of the functions of the server apparatus 101. For example, the gateway may store information regarding a presence or absence of an output portion of the terminal apparatus 102 or information regarding whether power supply of the terminal apparatus 102 is on or off. A configuration may be adopted in which the gateway selects a terminal apparatus 102 which includes an output portion and whose power supply is on, and transfers notification information, which has been transmitted to the gateway from the server apparatus 101, to the selected terminal apparatus 102.

(7) While the embodiments described above are configured such that one apparatus has functions (components), the present disclosure is not limited to this configuration. The present disclosure also includes cases where each function (component) is divided into apparatuses and a similar effect or function is realized by a combination of the apparatuses.

(8) A configuration may be adopted in which a part of or all of the components constituting each apparatus described above is constituted by an IC that is attachable to or detachable from each apparatus or by a stand-alone module. The IC card or the module is a computer system constituted by a microprocessor, a ROM, a RAM, or the like. The IC card or the module may be configured so as to include the super multifunctional LSI described earlier. As the microprocessor operates according to a computer program, the IC card or the module achieves its function. The IC card or the module may also be tamper resistant.

(9) The present disclosure may be the methods described above. The present disclosure may also be a computer program that realizes these methods by a computer or may be a digital signal constituted by the computer program.

In addition, the present disclosure may be a recording of the computer program or the digital signal on a computer-readable recording medium such as a flexible disk, a hard disk, a CD-ROM, an MO, a DVD, a DVD-ROM, a DVD-RAM, a BD (Blu-ray (registered trademark) Disc), and a semiconductor memory. Furthermore, the present disclosure may be the digital signal recorded on these recording media.

Furthermore, the present disclosure may be configured so that the computer program or the digital signal is transmitted via an electric communication line, a wireless or a wired communication line, a network such as the Internet, a data broadcast, or the like.

In addition, the present disclosure may be a computer system including a microprocessor and a memory, wherein the memory stores a computer program and the microprocessor may be operated in accordance with the computer program.

Furthermore, the present disclosure may be implemented by another independent computer system by recording the program or the digital signal on the recording media and transmitting the program or the digital signal or by transmitting the program or the digital signal via the network.

(10) The respective embodiments and the modifications described above may be combined with one another.

(Types of Cloud Service)

The techniques described in the aspects above may be realized by, for example, the following types of cloud services. However, the types that realize the techniques described in the aspects above are not limited to the following types.

(Service Type 1: Proprietary Data Center Type)

FIG. 34 shows a service type 1 (proprietary data center type). The present type is a type in which the service provider 120 acquires information from the group 100 and provides service to a user. In the present type, the service provider 120 is equipped with functions of a data center operating company. In other words, the service provider 120 owns a cloud server 111 that manages big data. Therefore, a data center operating company does not exist.

In the present type, the service provider 120 operates and manages the data center (the cloud server 111) (23). In addition, the service provider 120 manages an OS (22) and an application (21). The service provider 120 provides service using the OS (22) and the application (21) managed by the service provider 120 (24).

(Service Type 2: Type Using IaaS)

FIG. 35 shows a service type 2 (type using IaaS). In this case, IaaS stands for Infrastructure as a Service and refers to a cloud service provision model where an infrastructure for building and running a computer system itself is provided as an Internet-based service.

In the present type, the data center operating company 110 operates and manages the data center (the cloud server 111) (23). In addition, the service provider 120 manages an OS (22) and an application (21). The service provider 120 provides service using the OS (22) and the application (21) managed by the service provider 120 (24).

(Service Type 3: Type Using PaaS)

Figure 36:
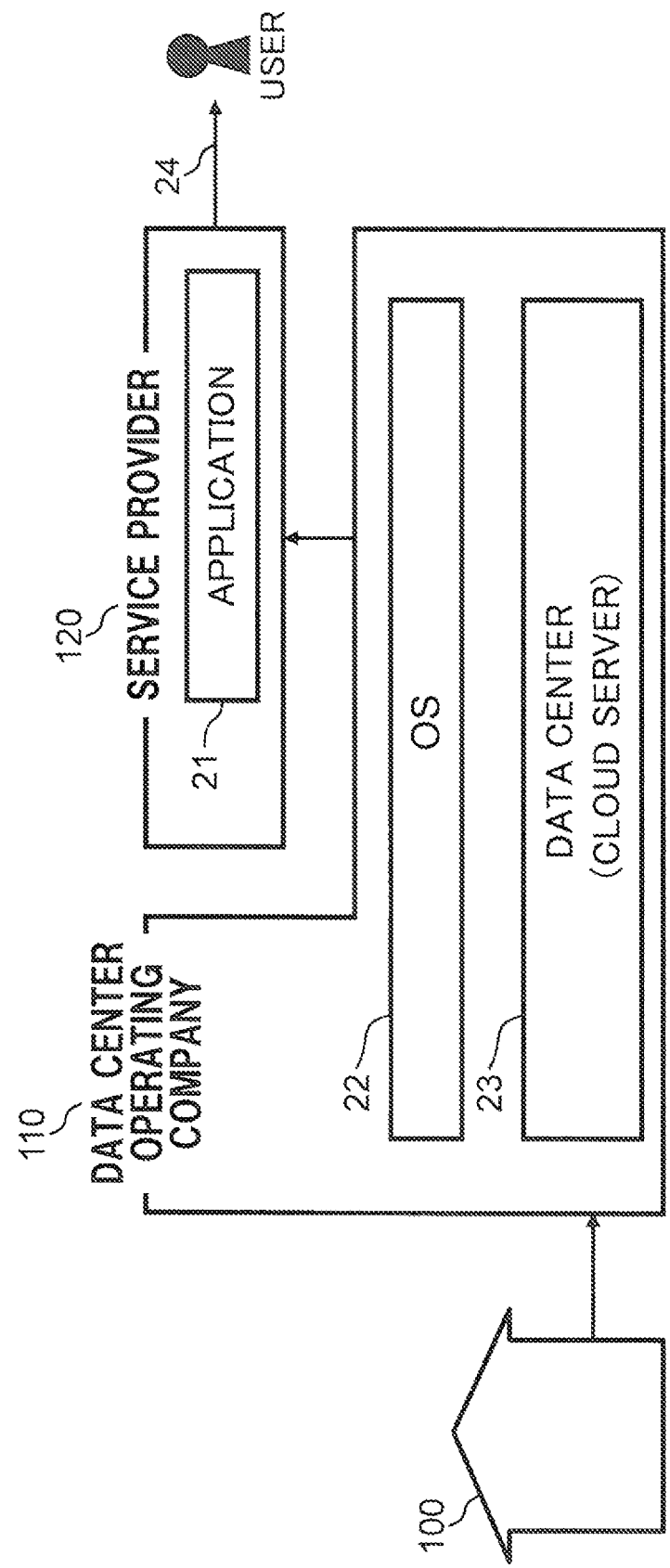
FIG. 36 shows an example of a type using PaaS.

FIG. 36 shows a service type 3 (type using PaaS). In this case, PaaS stands for Platform as a Service and refers to a cloud service provision model where a platform that constitutes a foundation for building and running software is provided as a service via the Internet.

In the present type, the data center operating company 110 manages the OS (22) and operates and manages the data center (cloud server 111) (23). In addition, the service provider 120 manages the application (21). The service provider 120 provides service using the OS (22) managed by the data center operating company 110 and the application (21) managed by the service provider 120 (24).

(Service Type 4: Type Using SaaS)

Figure 37:
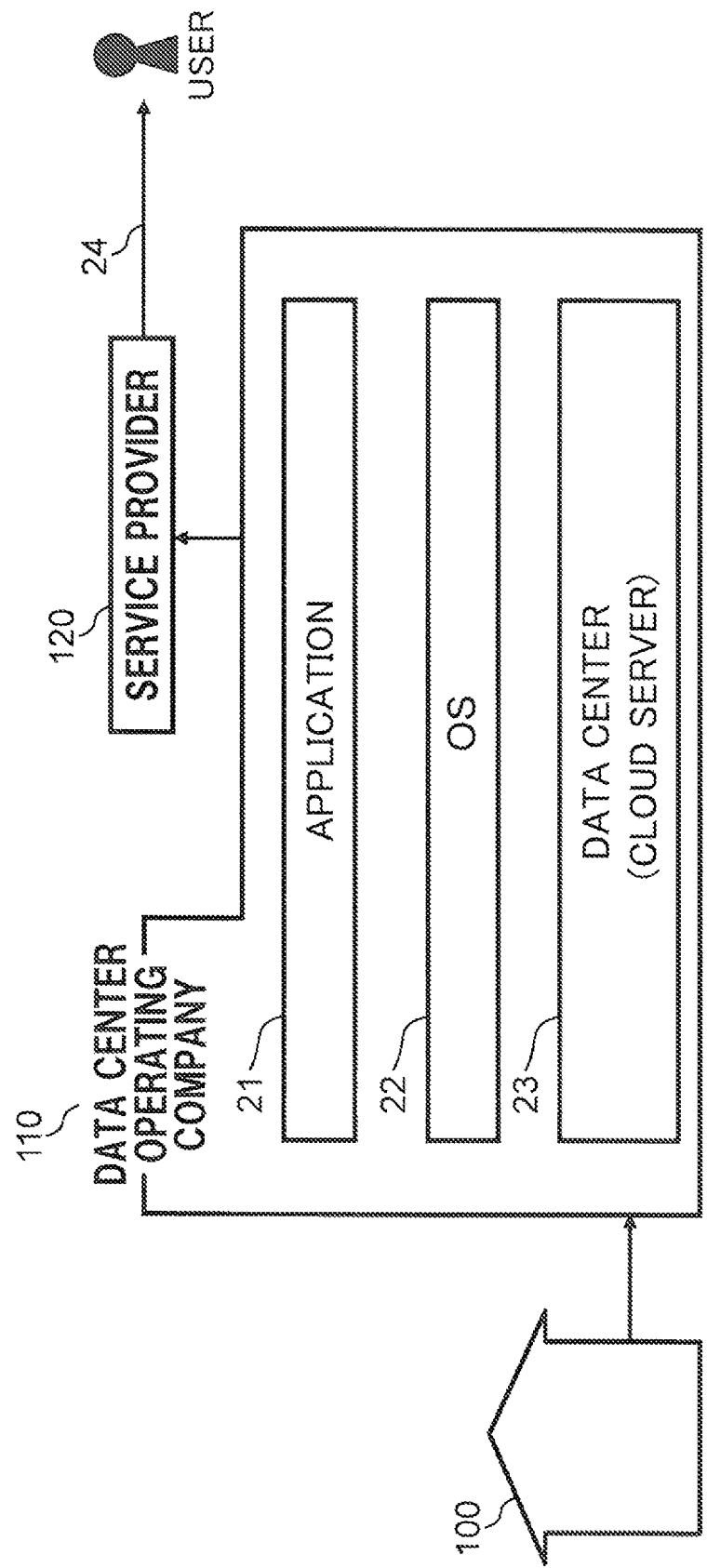
FIG. 37 shows an example of a type using SaaS.

FIG. 37 shows a service type 4 (type using SaaS). In this case, SaaS stands for Software as a Service. This is a cloud service provision model equipped with, for example, a function that enables a company or an individual (a user) that does not own a data center (cloud server) to use an application provided by a platform provider that owns a data center (cloud server) via a network such as the Internet.

In the present type, the data center operating company 110 manages the application (21), manages the OS (22), and operates and manages the data center (cloud server 111) (23). In addition, the service provider 120 provides service using the OS (22) and the application (21) managed by the data center operating company 110 (24).

In all of the types described above, it is assumed that the service provider 120 provides service. In addition, for example, the OS, the application, a database for big data, and the like may be developed in-house or may be outsourced to and developed by a third party by the service provider 120 or the data center operating company 110.

INDUSTRIAL APPLICABILITY

The information notification method, the program, and the information notification system according to the present disclosure includes a function of notifying a departure time that enables a user to be in time for a time the user should arrive at a destination to a notifying apparatus in accordance with a typical behavior pattern of the user and is useful in a networked electrical home appliance system.

The invention claimed is:

1. An information notification method in an information notification system which notifies a user of information related to behavior of the user, the information notification system including: a server apparatus including a processor that executes a program which manages behavior information related to the behavior of the user, the behavior information including information on a departure point and a destination of the user, and a typical departure time at which the user departs from the departure point; and one or more terminal apparatuses, the information notification method comprising:
    an acquiring step in which the server apparatus acquires today's required time required for traveling from the departure point to the destination, the departure point and the destination being included in the behavior information;
    a selecting step in which the server apparatus extrapolates a room in which the user is present by detecting a power supply state of the one or more terminal apparatuses, and selects a terminal apparatus having a power supply state of on as a notification apparatus; and
    a notifying step in which the server apparatus instructs the notifying apparatus to notify the user of notification information when the server apparatus judges that today's departure time, which is determined using the acquired today's required time, is earlier than the typical departure time.

2. The information notification method according to claim 1, wherein
    the behavior information further includes information on a typical arrival time at which the user arrives at the destination, and
    in the notifying step, the today's departure time is determined using the acquired today's required time and the typical arrival time.

3. The information notification method according to claim 1, wherein
    the server apparatus manages apparatus information related to the one or more terminal apparatuses,
    the one or more terminal apparatuses include one or more notifying apparatuses as the notifying apparatus,
    the apparatus information includes output portion information indicating whether or not the terminal apparatus includes an output portion,
    in the selecting step, a terminal apparatus including an output portion is selected as the notifying apparatus, using the apparatus information, and
    in the notifying step, the notification information is notified to the terminal apparatus selected as the notifying apparatus in the selecting step.

4. The information notification method according to claim 3, wherein the apparatus information further includes power information which indicates whether power supply of the terminal apparatus is on or off, and in the selecting step, a terminal apparatus that includes an output portion and whose power is turned on is selected as the notifying apparatus, using the output portion information and the power information.

5. The information notification method according to claim 3, wherein the apparatus information further includes operation information which indicates whether or not the terminal apparatus is being operated by the user, and in the selecting step, a terminal apparatus that includes an output portion and that is being operated by the user is selected as the notifying apparatus, using the output portion information and the operation information.

6. The information notification method according to claim 3, wherein the apparatus information further includes power information indicating whether power supply of the terminal apparatus is on or off and location information indicating a room in which the terminal apparatus is located, and in the selecting step, a terminal apparatus that is arranged in the extrapolated room and that includes an output portion is selected as the notifying apparatus.

7. The information notification method according to claim 1, further comprising:

an input accepting step for accepting a user confirmation indicating that the user has confirmed the notification information notified to the notifying apparatus; and a deleting step for deleting from the notifying apparatus the notification information output to the notifying apparatus when the user confirmation is accepted in the input accepting step.

8. The information notification method according to claim 1, wherein the server apparatus manages apparatus information related to the one or more terminal apparatuses, the apparatus information includes output portion information indicating whether or not the terminal apparatus includes an output portion and whether or not the output portion has an alarm function which emits an alarm to the user, the behavior information further includes information on a typical wakeup time of the user, the server apparatus judges whether or not the determined today's departure time is earlier than the typical wakeup time of the user included in the behavior information, in the notifying step, when judgment is made that the determined today's departure time is earlier than the typical wakeup time, a terminal apparatus that includes an output portion having an alarm function is notified of an instruction to advance a set time of the alarm function as the notification information, and a set time of the alarm function of the terminal apparatus is advanced in accordance with contents of the notified instruction.

9. The information notification method according to claim 1, wherein the server apparatus manages apparatus information related to one or more terminal apparatuses owned by the user, the apparatus information includes output portion information indicating whether or not the terminal apparatus includes an output portion and whether or not the output portion has an alarm function which emits an alarm to the user, the behavior information further includes information on a typical wakeup time of the user and a time required from waking up to departure by the user, the server apparatus judges whether or not the time required from waking up to departure by the user included in the behavior information is longer than a difference between the determined today's departure time and the typical wakeup time of the user included in the behavior information, in the notifying step, when judgment is made that the time required from waking up to departure by the user is longer than the difference between the determined today's departure time and the typical wakeup time of the user, an instruction to advance a set time of the alarm function is notified as the notification information to a terminal apparatus that includes an output portion having the alarm function, and a set time of the alarm function of the terminal apparatus is advanced in accordance with contents of the notified instruction.

10. The information notification method according to claim 1, wherein the notifying apparatus notifies the user of the notification information so as to recommend to the user an adjustment in the behavior of the user.

11. The information notification method according to claim 1, wherein one of the terminal apparatuses comprises the server apparatus.

12. An information notification system comprising:

a server apparatus including a processor that executes a program which manages behavior information related to behavior of a user, the behavior information including information on a departure point and a destination of the user, and a typical departure time at which the user departs from the departure point; and one or more terminal apparatuses, wherein:

the server apparatus acquires today's required time required for traveling from the departure point to the destination, the departure point and the destination being included in the behavior information;

the server apparatus extrapolates a room in which the user is present by detecting a power supply state of the one or more terminal apparatuses, and selects a terminal apparatus having a power supply state of on as a notification apparatus; and the server apparatus instructs the notifying apparatus to notify the user of notification information when the server apparatus judges that today's departure time, which is determined using the acquired today's required time, is earlier than the typical departure time.

13. The information notification system according to claim 12, wherein one of the terminal apparatuses comprises the server apparatus.

14. The information notification system of claim 12, wherein the notifying apparatus notifies the user of the notification information so as to recommend to the user an adjustment in the behavior of the user.

15. A non-transitory computer-readable recording medium which stores a program executed in an information notification system which notifies a user of information related to behavior of the user, the information notification system including: a server apparatus including a processor that executes a program which manages behavior information related to the behavior of the user, the behavior information including information on a departure point and a destination of the user, and a typical departure time at which the user departs from the departure point; and one or more terminal apparatuses, the program causing the processor to execute:
- an acquiring step in which the server apparatus acquires today's required time required for traveling from the departure point to the destination, the departure point and the destination being included in the behavior information;
- a selecting step in which the server apparatus extrapolates a room in which the user is present by detecting a power supply state of the one or more terminal apparatuses, and selects a terminal apparatus having a power supply state of on as a notification apparatus; and
- a notifying step in which the server apparatus instructs the notifying apparatus to notify the user of notification information when the server apparatus judges that today's departure time, which is determined using the acquired today's required time, is earlier than the typical departure time.

* * * * *